(12) United States Patent
Galdamez

(10) Patent No.: US 11,034,061 B2
(45) Date of Patent: *Jun. 15, 2021

(54) METHODS FOR APPLYING MATERIALS AROUND PROTUBERANCES

(71) Applicant: The Boeing Company, Chicago, IL (US)

(72) Inventor: Kevin P. Galdamez, High Point, NC (US)

(73) Assignee: The Boeing Company, Chicago, IL (US)

( * ) Notice: Subject to any disclaimer, the term of this patent is extended or adjusted under 35 U.S.C. 154(b) by 523 days.

This patent is subject to a terminal disclaimer.

(21) Appl. No.: 15/978,399

(22) Filed: May 14, 2018

(65) Prior Publication Data

US 2019/0344481 A1 Nov. 14, 2019

(51) Int. Cl.
*B29C 39/10* (2006.01)
*B29C 39/02* (2006.01)
*B29C 39/26* (2006.01)

(52) U.S. Cl.
CPC ............ *B29C 39/026* (2013.01); *B29C 39/10* (2013.01); *B29C 39/26* (2013.01)

(58) Field of Classification Search
CPC ........ B29C 39/026; B29C 39/10; B29C 39/26
USPC ........................................................ 264/219
See application file for complete search history.

(56) References Cited

U.S. PATENT DOCUMENTS

| | | | | |
|---|---|---|---|---|
| 8,978,668 B2* | 3/2015 | Loza Cebreros | ...... | A45D 29/00 132/285 |
| 9,060,585 B1* | 6/2015 | Tran | ...... | A45D 34/04 |
| 10,913,091 B2* | 2/2021 | Galdamez | ...... | B05B 12/20 |
| 2011/0305583 A1* | 12/2011 | Lee | ...... | F01D 25/12 416/97 R |
| 2015/0182993 A1* | 7/2015 | Binner | ...... | B05C 5/02 428/195.1 |

* cited by examiner

*Primary Examiner* — Jeffrey M Wollschlager
*Assistant Examiner* — Xue H Liu
(74) *Attorney, Agent, or Firm* — Kwan & Olynick LLP

(57) ABSTRACT

A method of applying material to a workpiece around a protuberance, extending from the workpiece, comprises advancing a template toward the workpiece to insert the protuberance into a positioning opening, located in a first portion of the template. The method also comprises removably attaching at least a second portion to the workpiece and separating the first portion of the template from the second portion along an interface while at least the second portion remains attached to the workpiece. The method further comprises applying the material to the workpiece around the protuberance such that the material overlaps a second inner peripheral edge of the second portion of the template, but does not overlap a visual material-placement indicator. The method also comprises detaching the second portion of the template from the workpiece.

20 Claims, 17 Drawing Sheets

METHODS FOR APPLYING MATERIALS AROUND PROTUBERANCES

TECHNICAL FIELD

The present disclosure relates to templates and methods for controlling application of materials around protuberances extending from workpieces.

BACKGROUND

Consistent and accurate application of material, such as an adhesive, a sealant, an encapsulant, or the like, around a protuberance, extending from a workpiece, can be challenging, since the protuberance complicates the material-application process. For example, the material may not reach the base of the protuberance or portions of the workpiece may be blocked by the protuberance. Furthermore, the material may contaminate parts of the workpiece away from the protuberance, which should be kept free from the material. Additionally, the material may need to conform to a particular shape once applied, which may be difficult to control. Finally, the material may have flow characteristics (e.g., high or low viscosity), which further complicate application of the material in a controlled manner.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a template for controlling application of material around a protuberance. The protuberance extends from a workpiece and has a base. The template comprises a first portion and a second portion, removably attached to the first portion. The first portion comprises a first inner peripheral edge that at least partially defines a positioning opening and that is geometrically complementary to at least a portion of the base of the protuberance. The first portion also comprises a first outer peripheral edge, opposite the first inner peripheral edge. The first portion additionally comprises a first-portion workpiece-facing surface that is located between the first inner peripheral edge and the first outer peripheral edge. The first portion further comprises a first-portion environment-facing surface, located between the first inner peripheral edge and the first outer peripheral edge and opposite the first-portion workpiece-facing surface. The second portion comprises a second inner peripheral edge and a second outer peripheral edge, opposite the second inner peripheral edge. The second portion also comprises a second-portion workpiece-facing surface, defined between the second inner peripheral edge and the second outer peripheral edge. The second portion additionally comprises a second-portion environment-facing surface, defined between the second inner peripheral edge and the second outer peripheral edge and opposite the second-portion workpiece-facing surface. The second-portion environment-facing surface partially overlaps with and is removably attached to the first-portion workpiece-facing surface, forming an interface between the first-portion workpiece-facing surface and the second-portion environment-facing surface. The second portion further comprises a visual material-placement indicator, located on the second-portion environment-facing surface and an adhesive layer, located on at least a portion of the second-portion workpiece-facing surface.

Another example of the subject matter according to the invention relates to a method of applying material to a workpiece around a protuberance, extending from the workpiece. The method comprises advancing a template toward the workpiece to insert the protuberance into a positioning opening, located in a first portion of the template. A first-portion workpiece-facing surface of the first portion partially overlaps with and is removably attached to a second-portion environment-facing surface of the second portion, forming an interface between the first-portion workpiece-facing surface and the second-portion environment-facing surface. The template is advanced toward the workpiece until the template is at least partially located relative to the workpiece via a first inner peripheral edge of the first portion and an adhesive layer, located on at least a portion of a second-portion workpiece-facing surface of the second portion, is in contact with the workpiece. The first inner peripheral edge of the first portion is geometrically complementary to a base of the protuberance and defines the positioning opening. The second-portion workpiece-facing surface is opposite the second-portion environment-facing surface. The method also comprises removably attaching at least the portion of the second-portion workpiece-facing surface to the workpiece. The method further comprises separating the first portion of the template from the second portion along the interface while at leak the portion of the second-portion workpiece-facing surface remains attached to the workpiece. The method additionally comprises applying the material to the workpiece around the protuberance such that the material overlaps a second inner peripheral edge of the second portion of the template, but does not overlap a visual material-placement indicator, located on the second-portion environment-facing surface. The visual material-placement indicator surrounds and is spaced away from the second inner peripheral edge. The method further comprises detaching the second portion of the template from the workpiece.

BRIEF DESCRIPTION OF THE DRAWINGS

Figure 1:
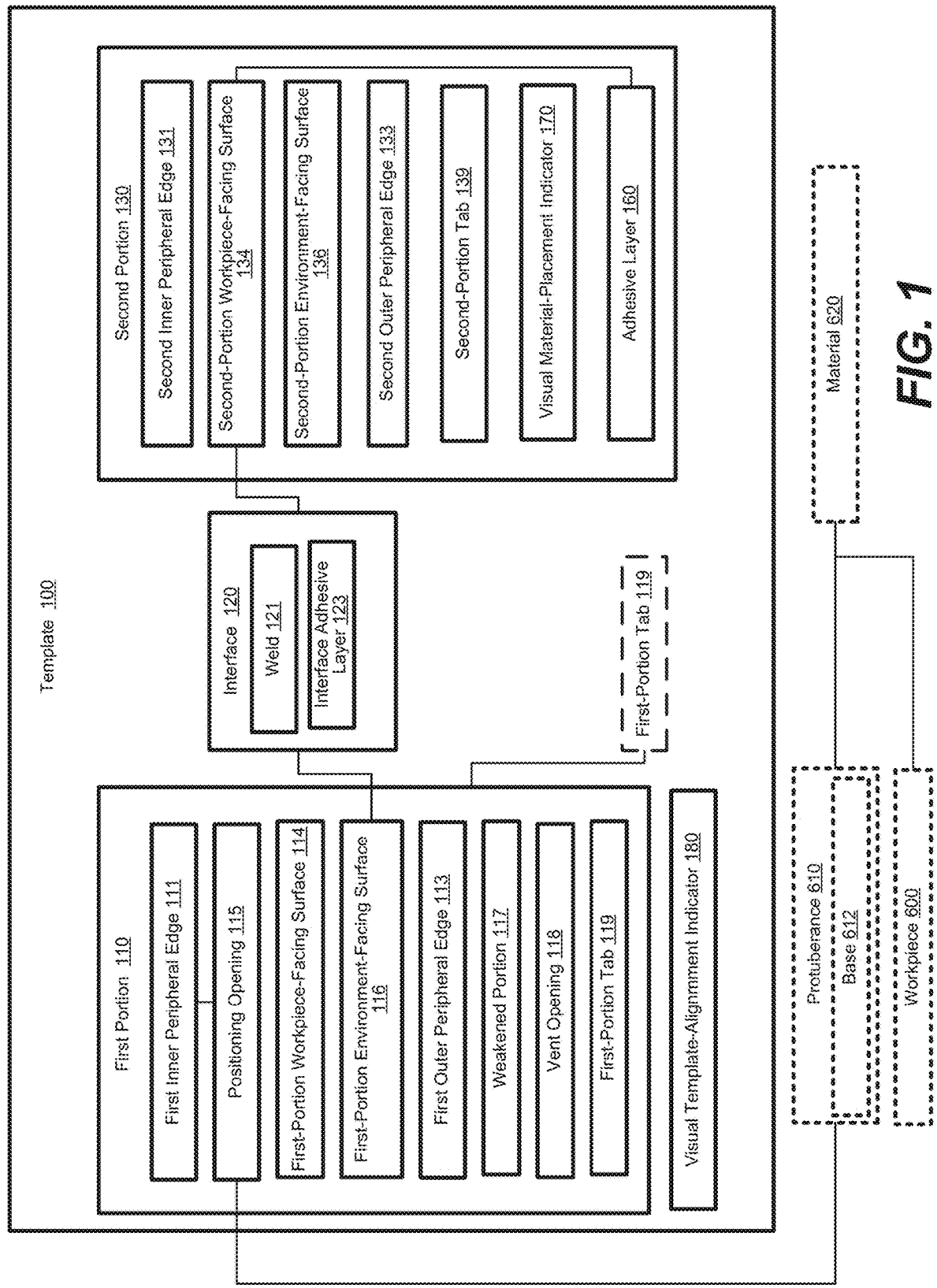
Figure 2A:
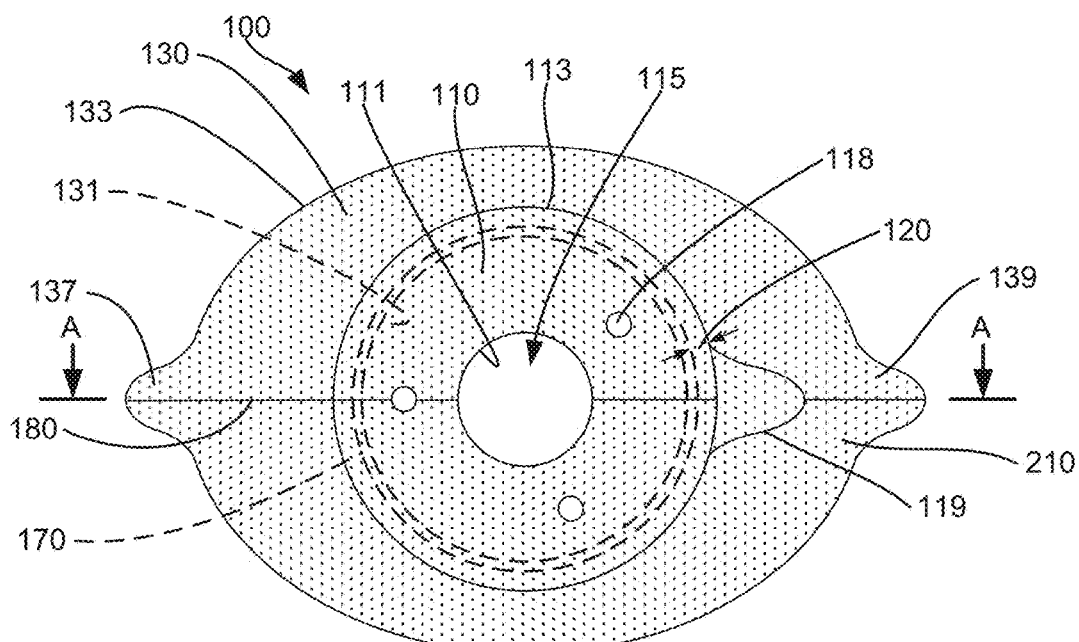
Figure 2B:
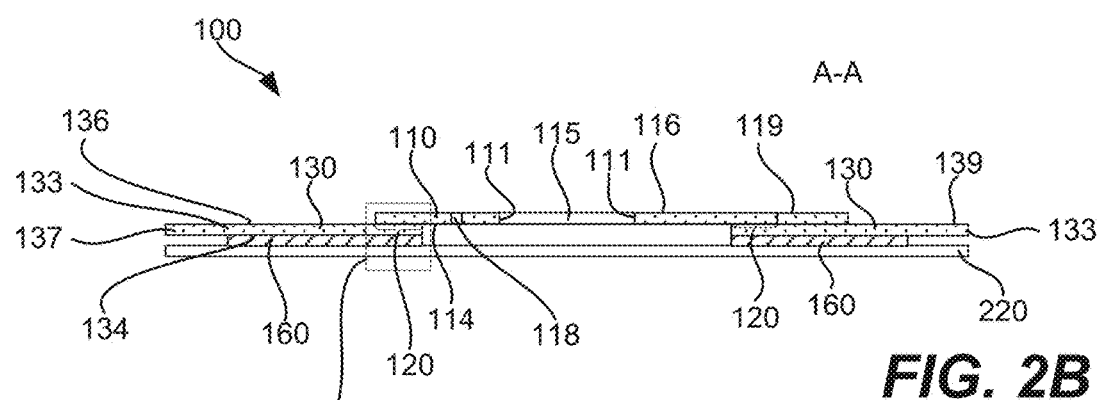
Figure 2C:
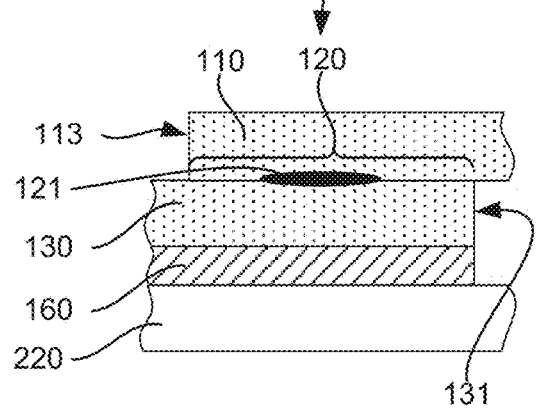
Figure 2D:
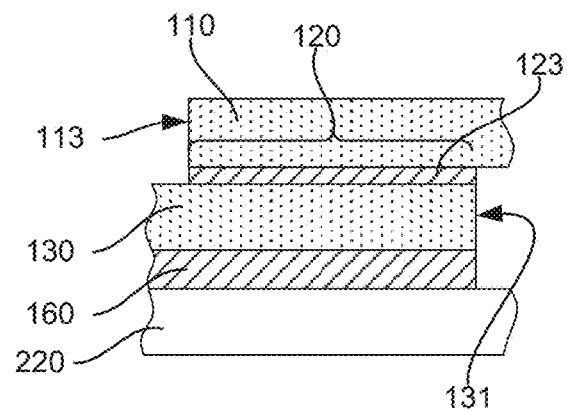
Figure 2E:
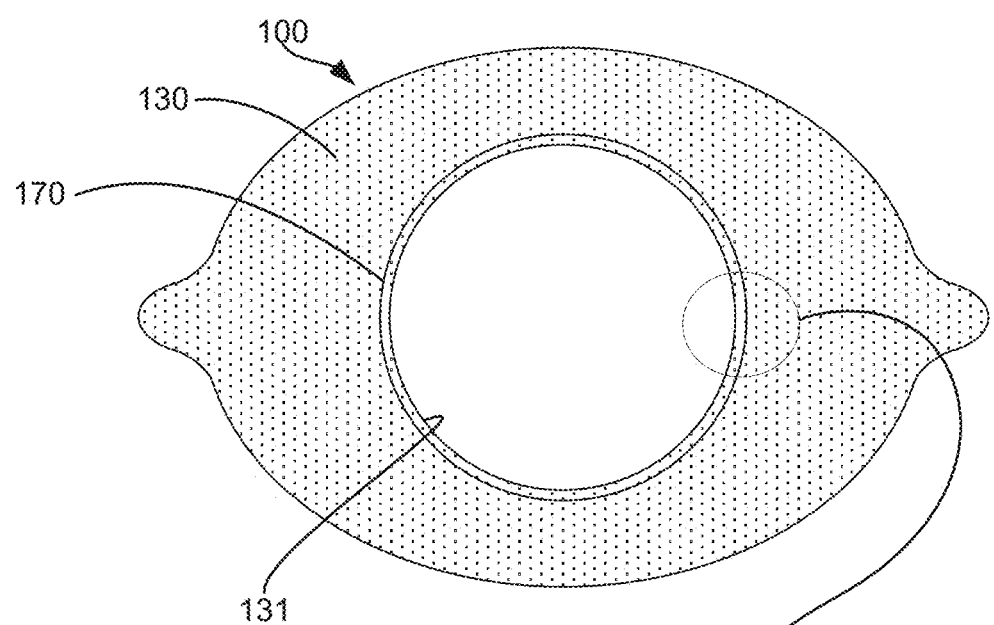
Figure 2F:
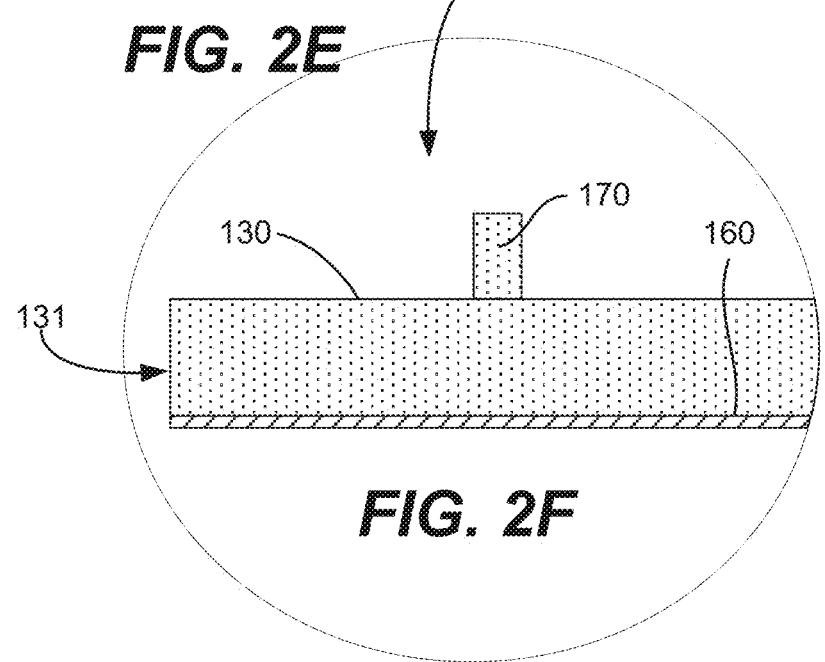
Figure 2G:
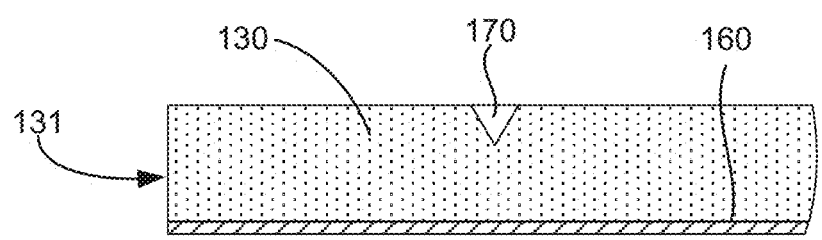
Figure 3A:
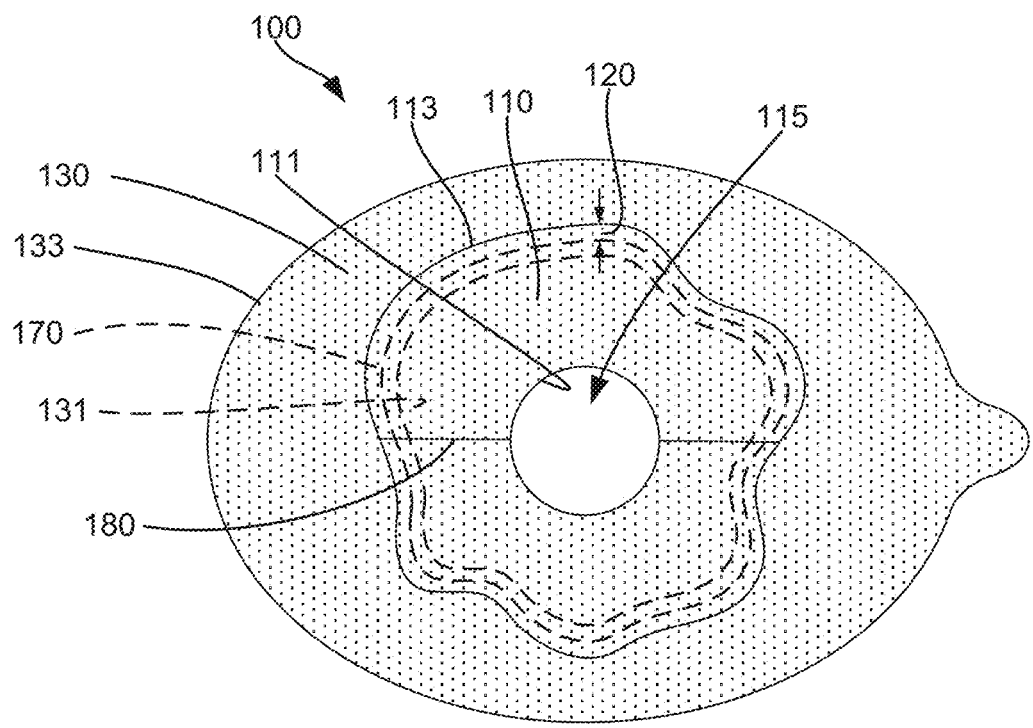
Figure 3B:
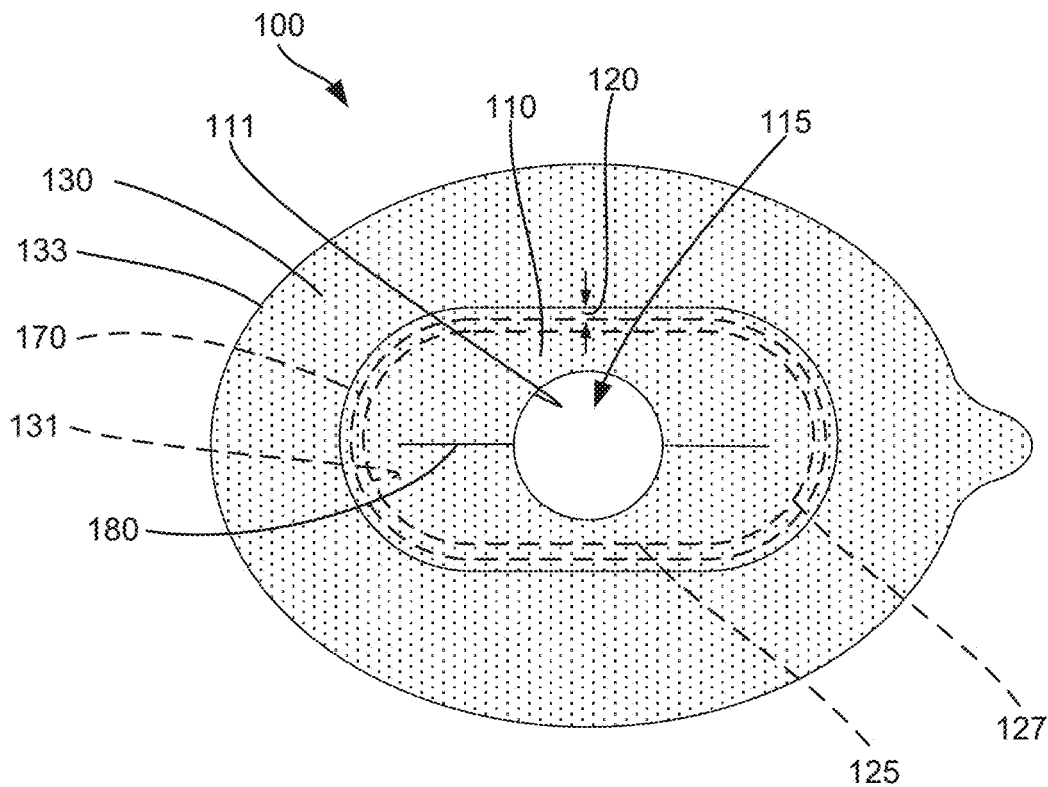
Figure 3C:
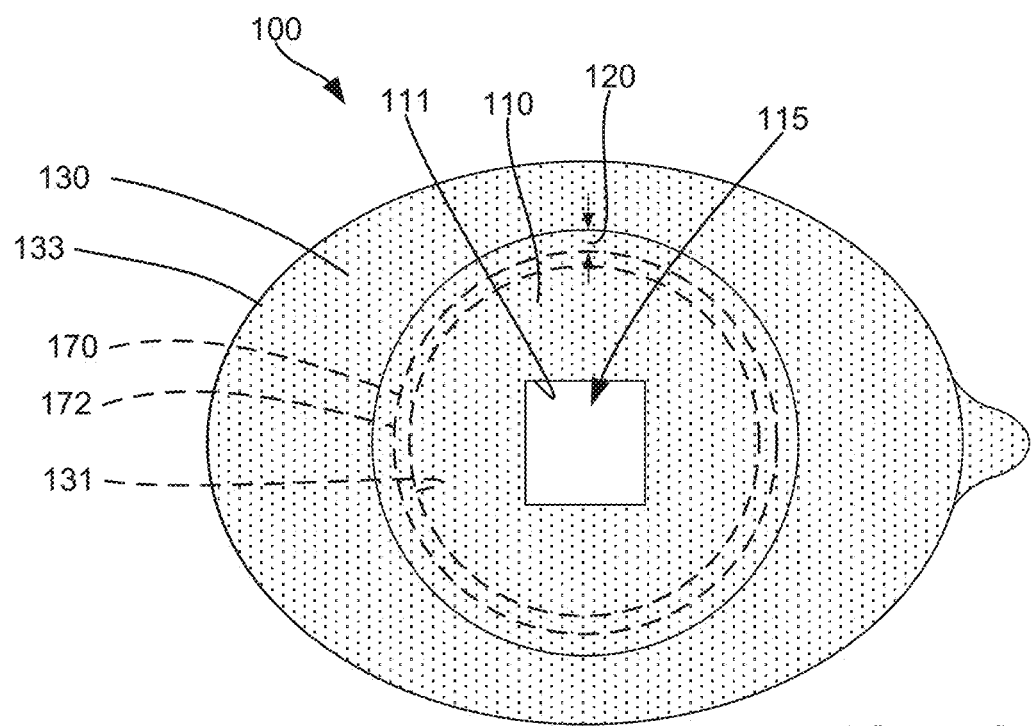
Figure 3D:
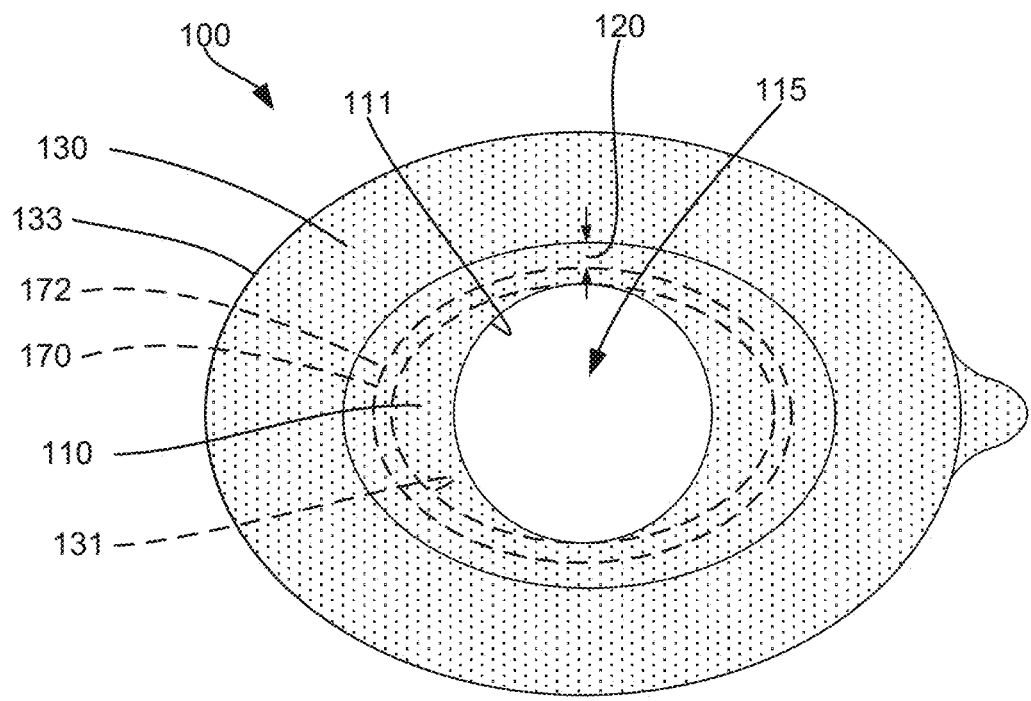
Figure 4A:
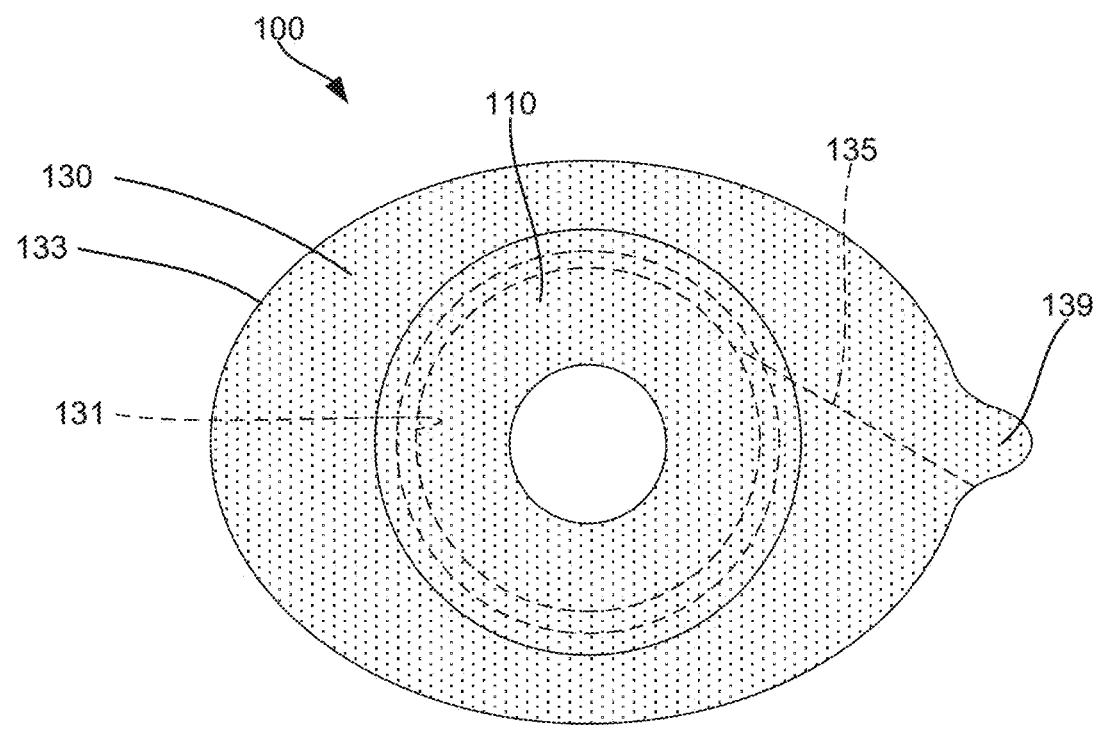
Figure 4B:
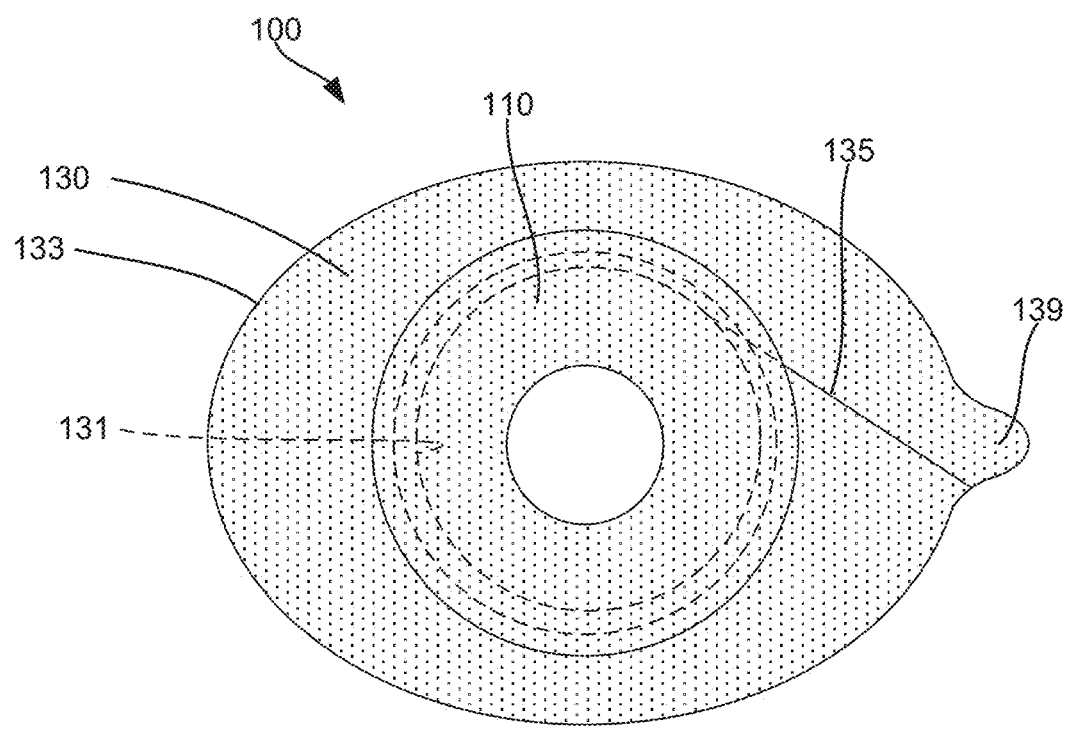
Figure 4C:
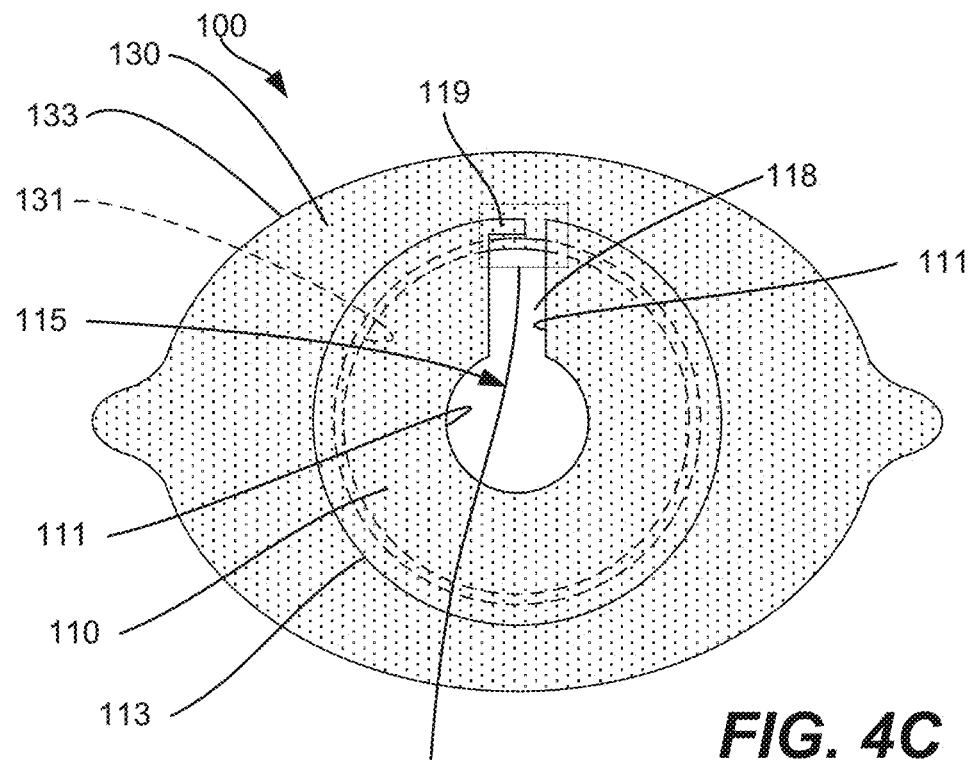
Figure 4D:
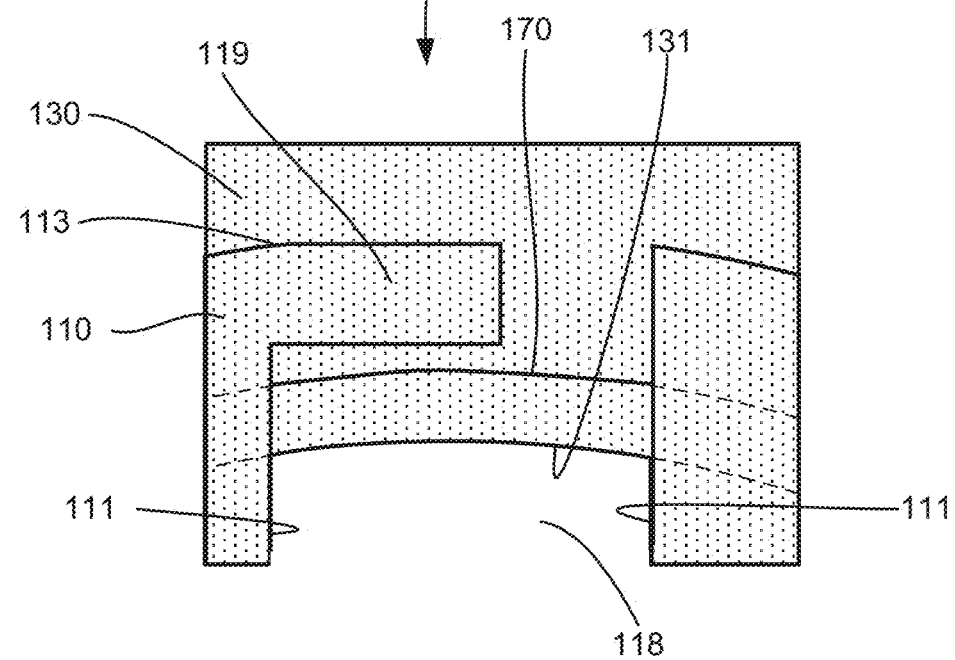
Figure 4E:
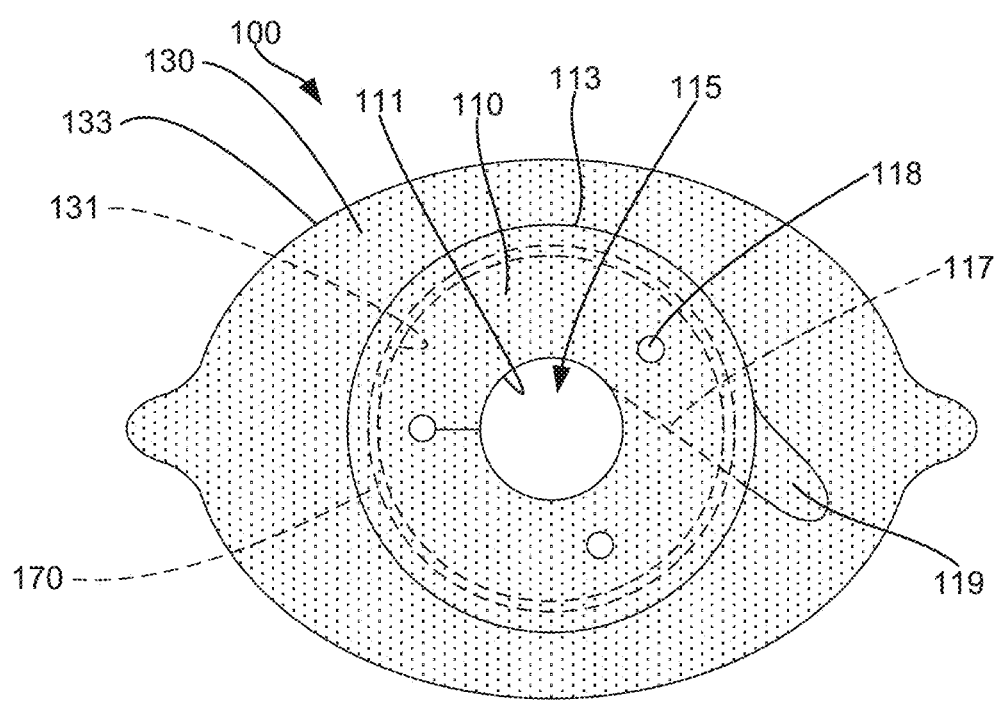
Figure 4F:
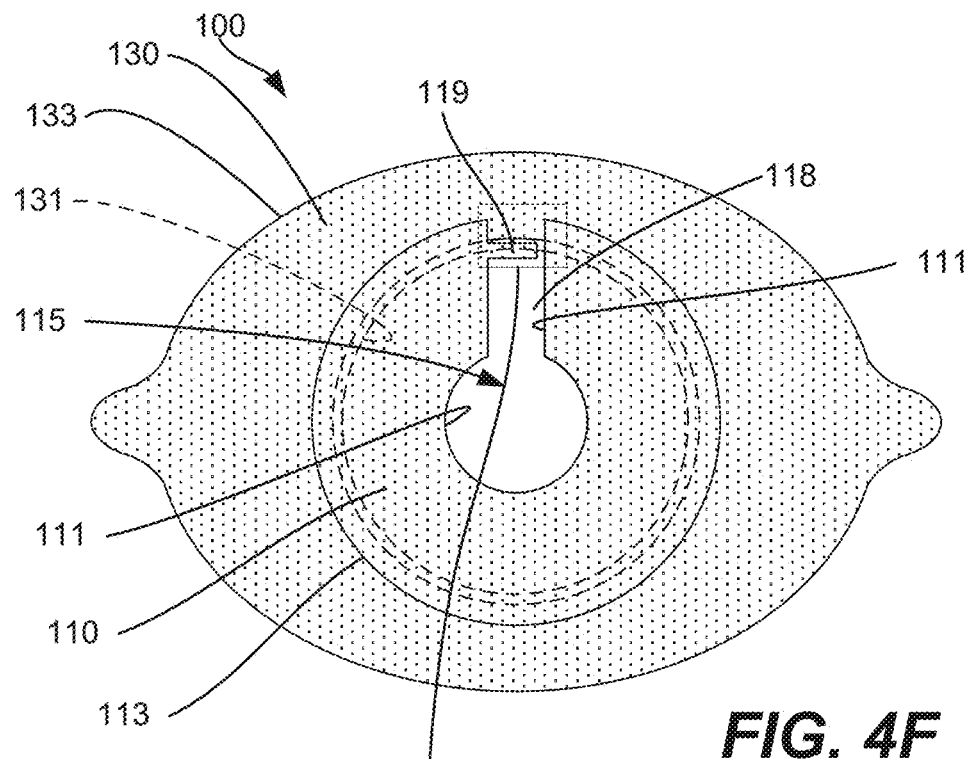
Figure 4G:
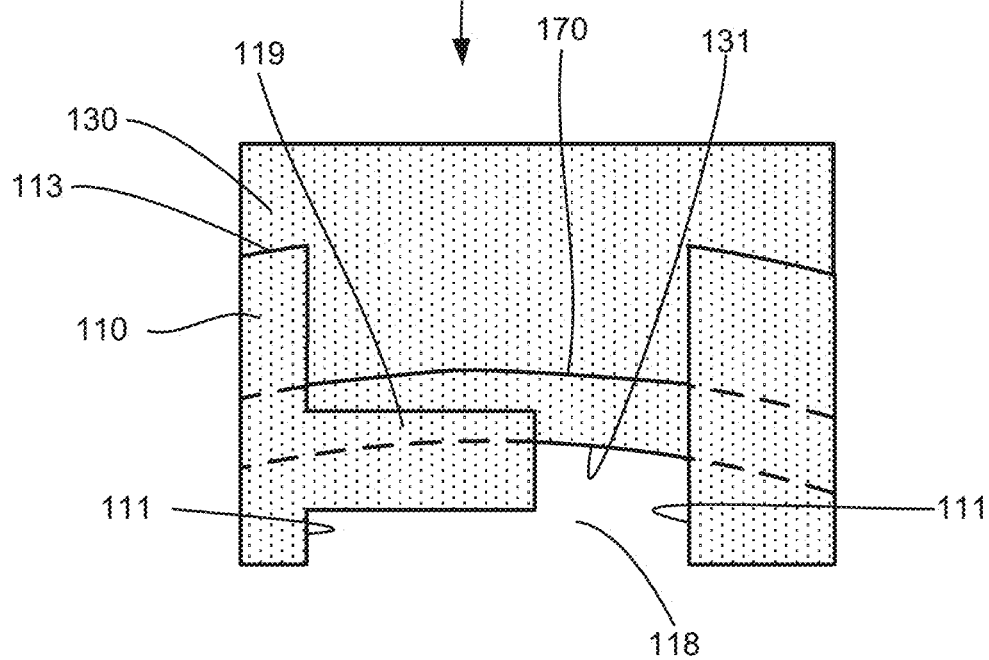
Figure 5:
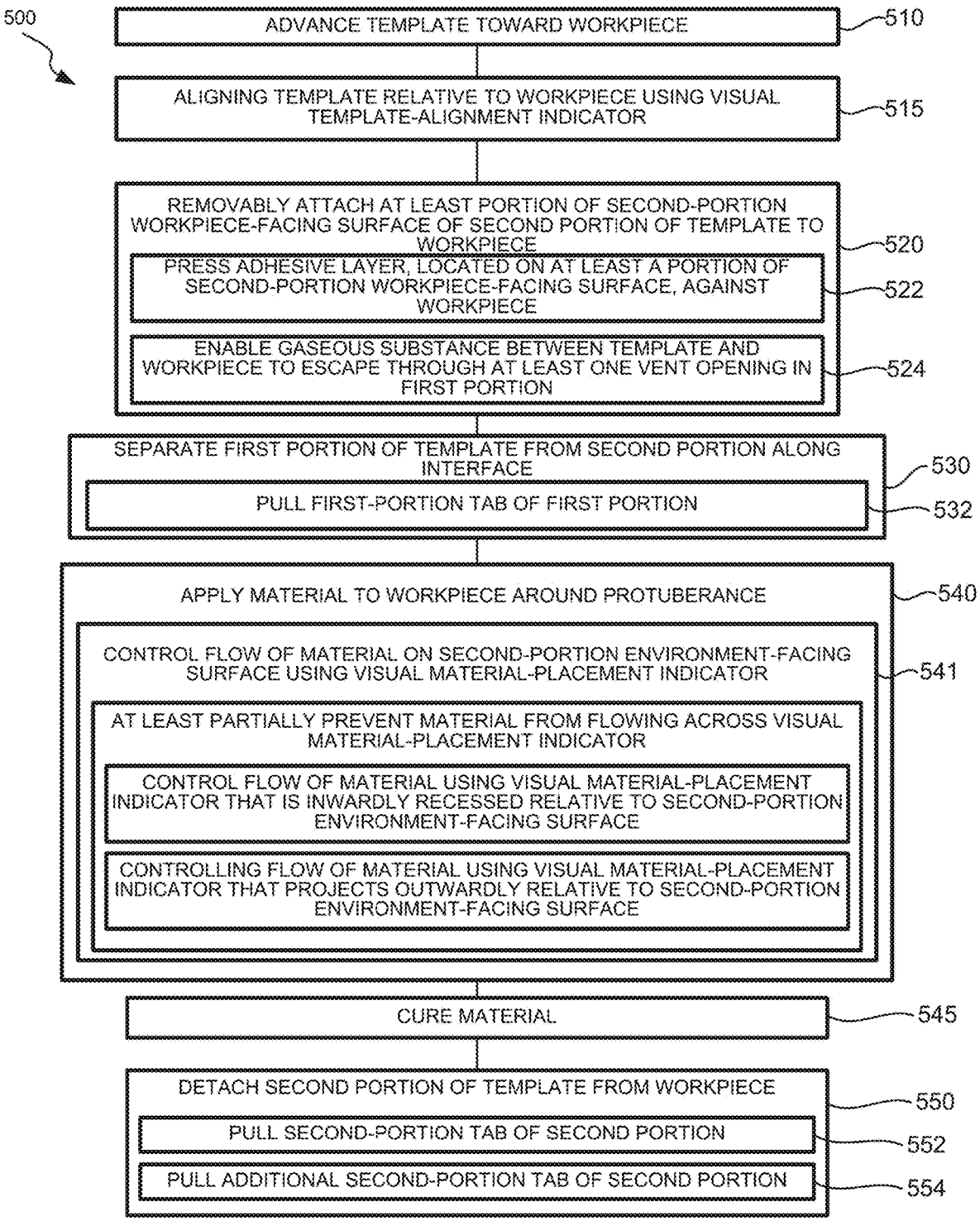
Figure 6A:
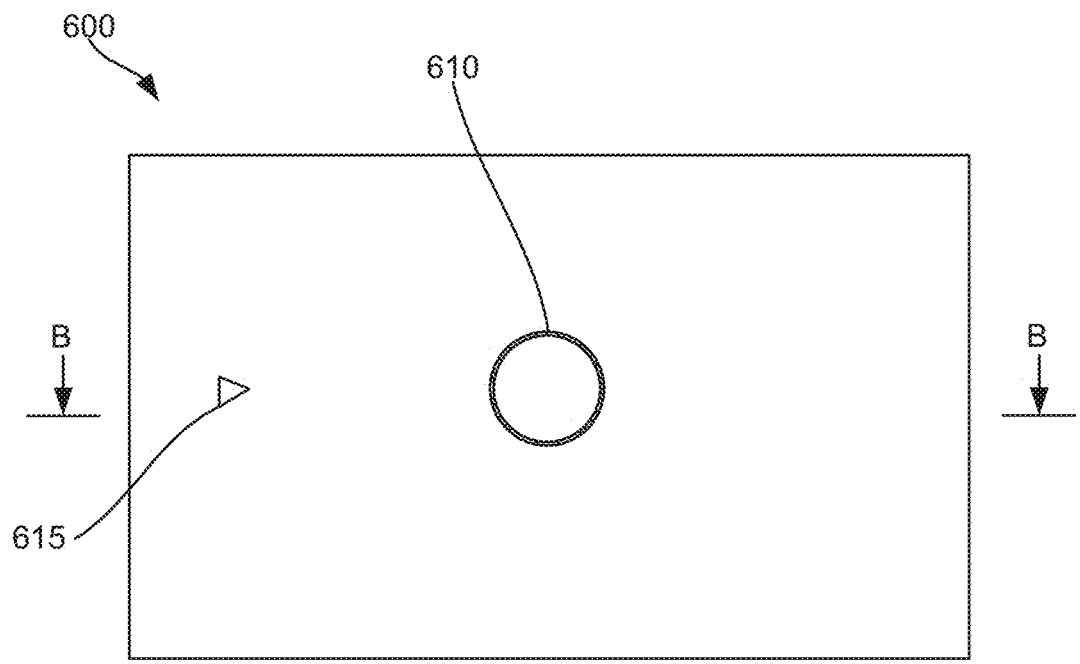
Figure 6B:
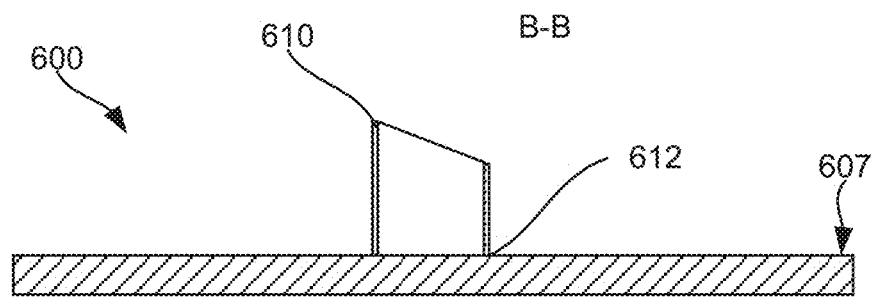
Figure 6C:
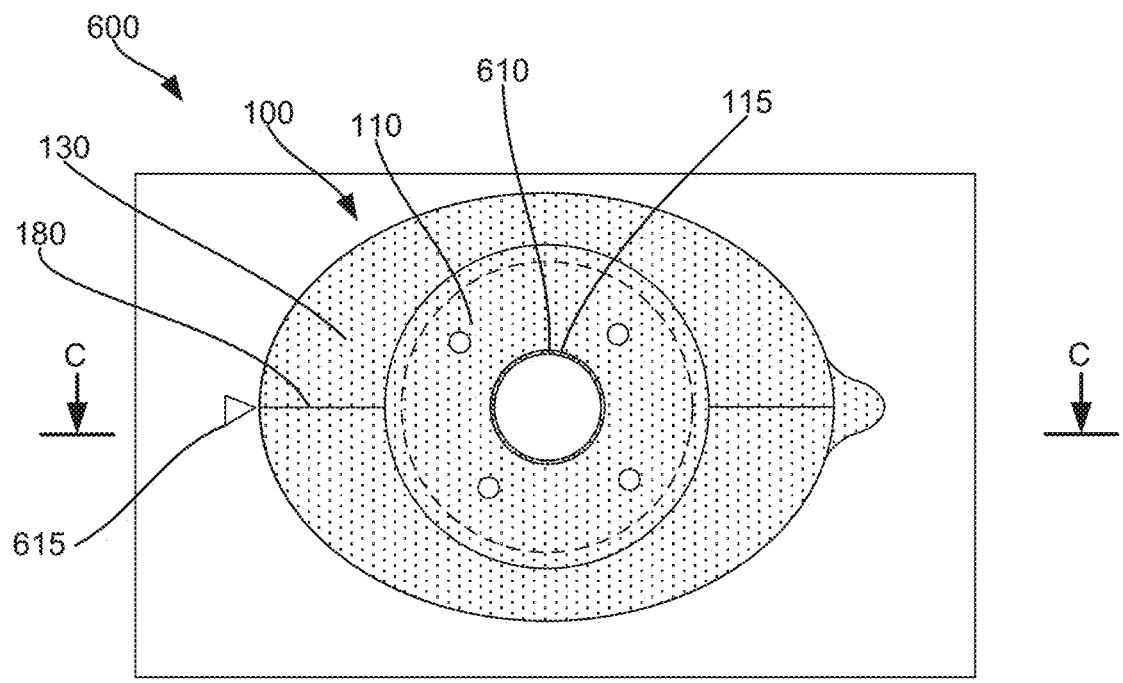
Figure 6D:
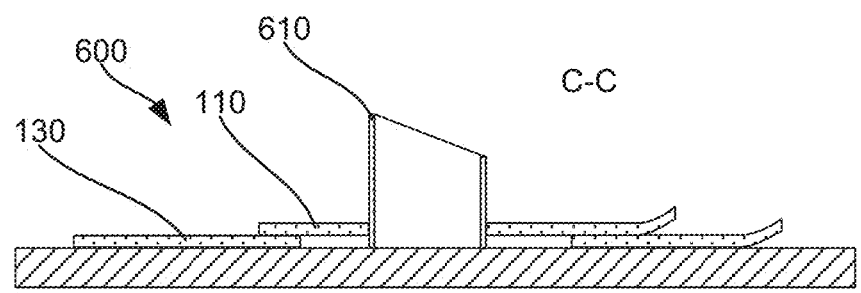
Figure 6E:
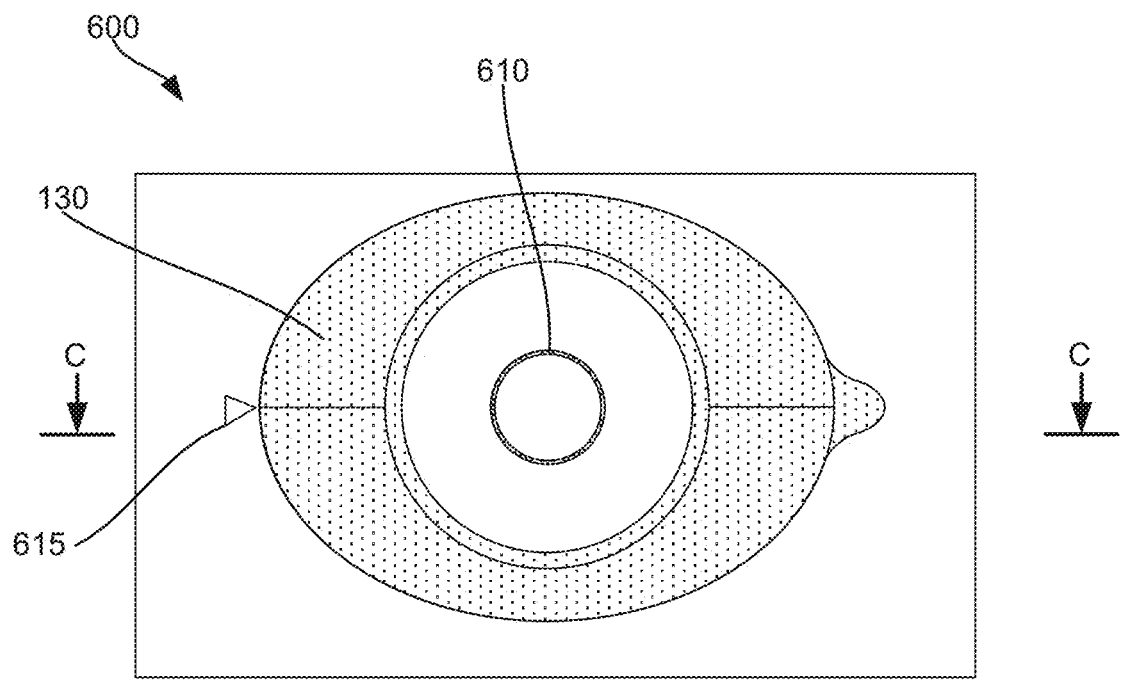
Figure 6F:
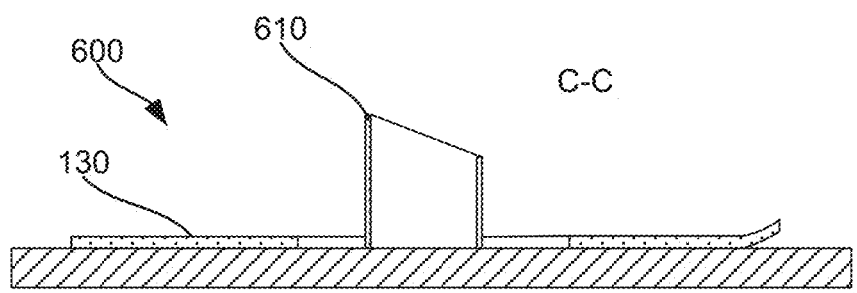
Figure 6G:
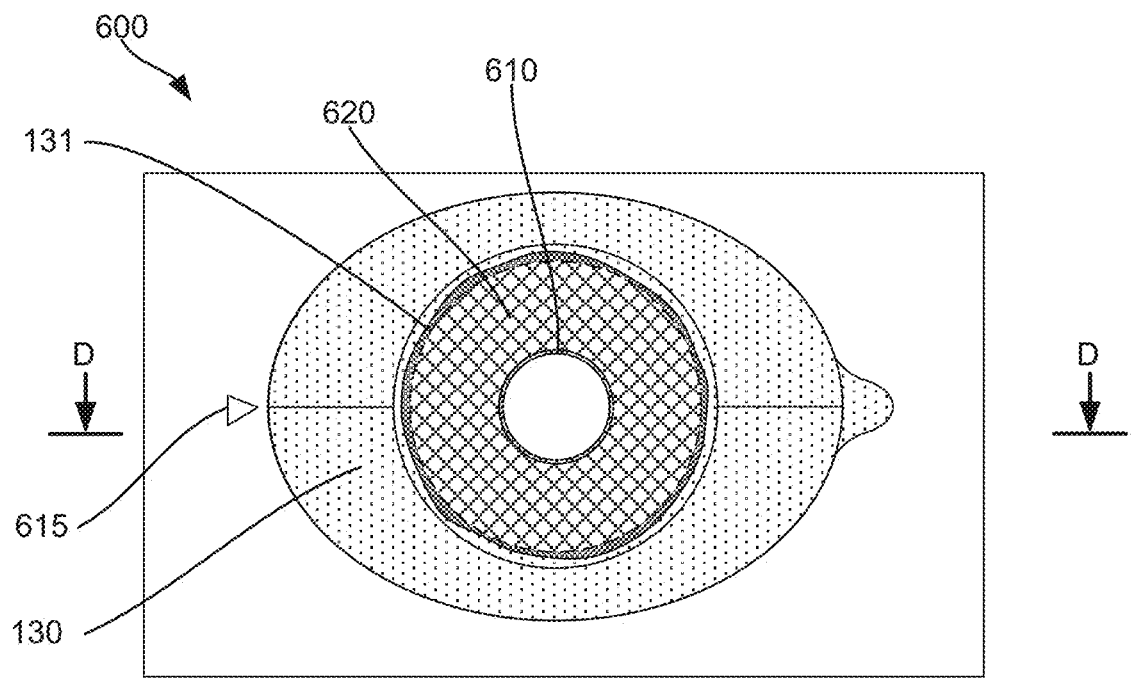
Figure 6H:
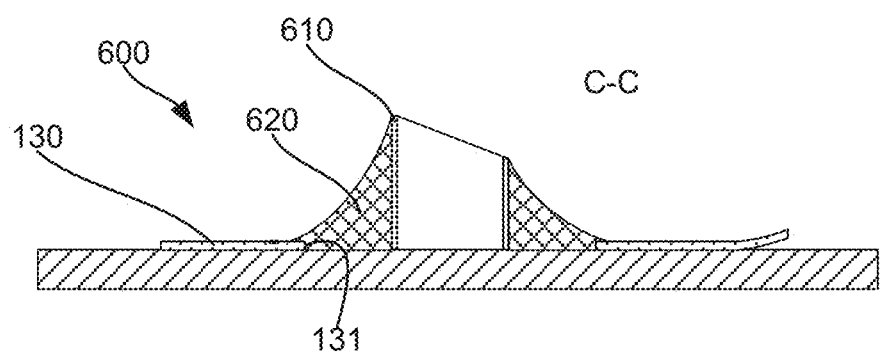
Figure 6I:
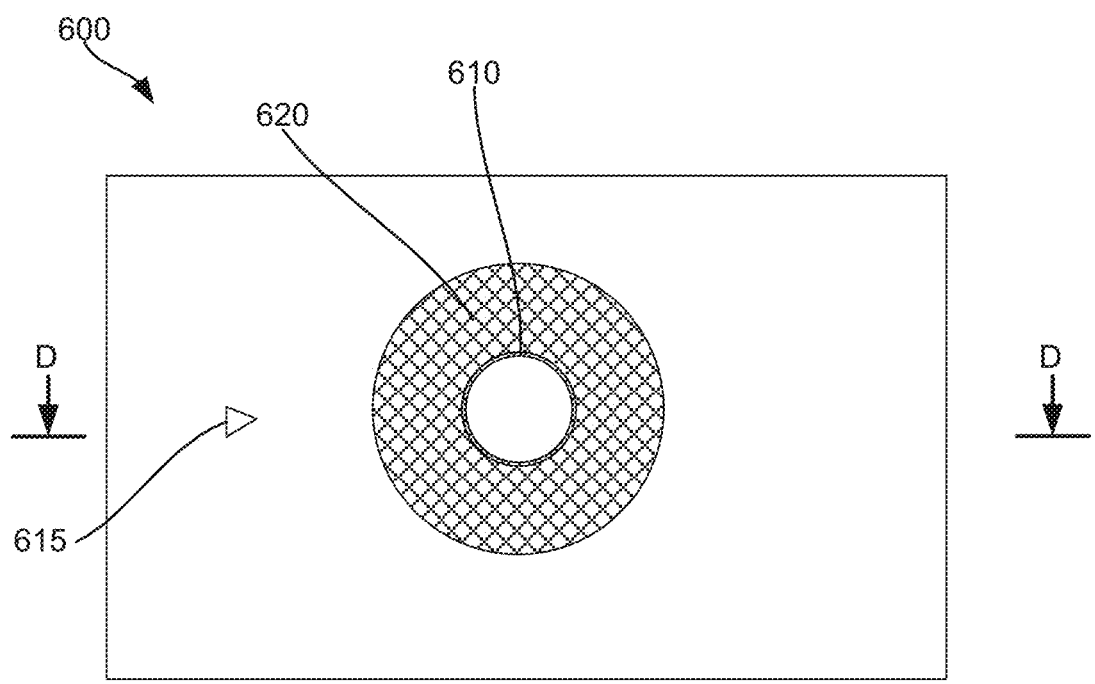
Figure 6J:
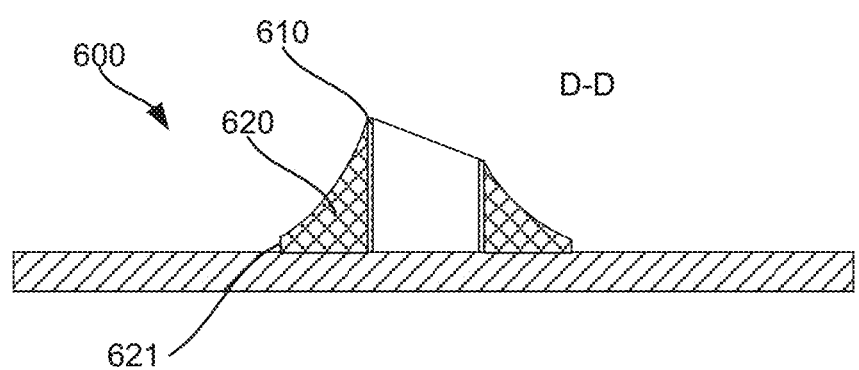
Figure 7:
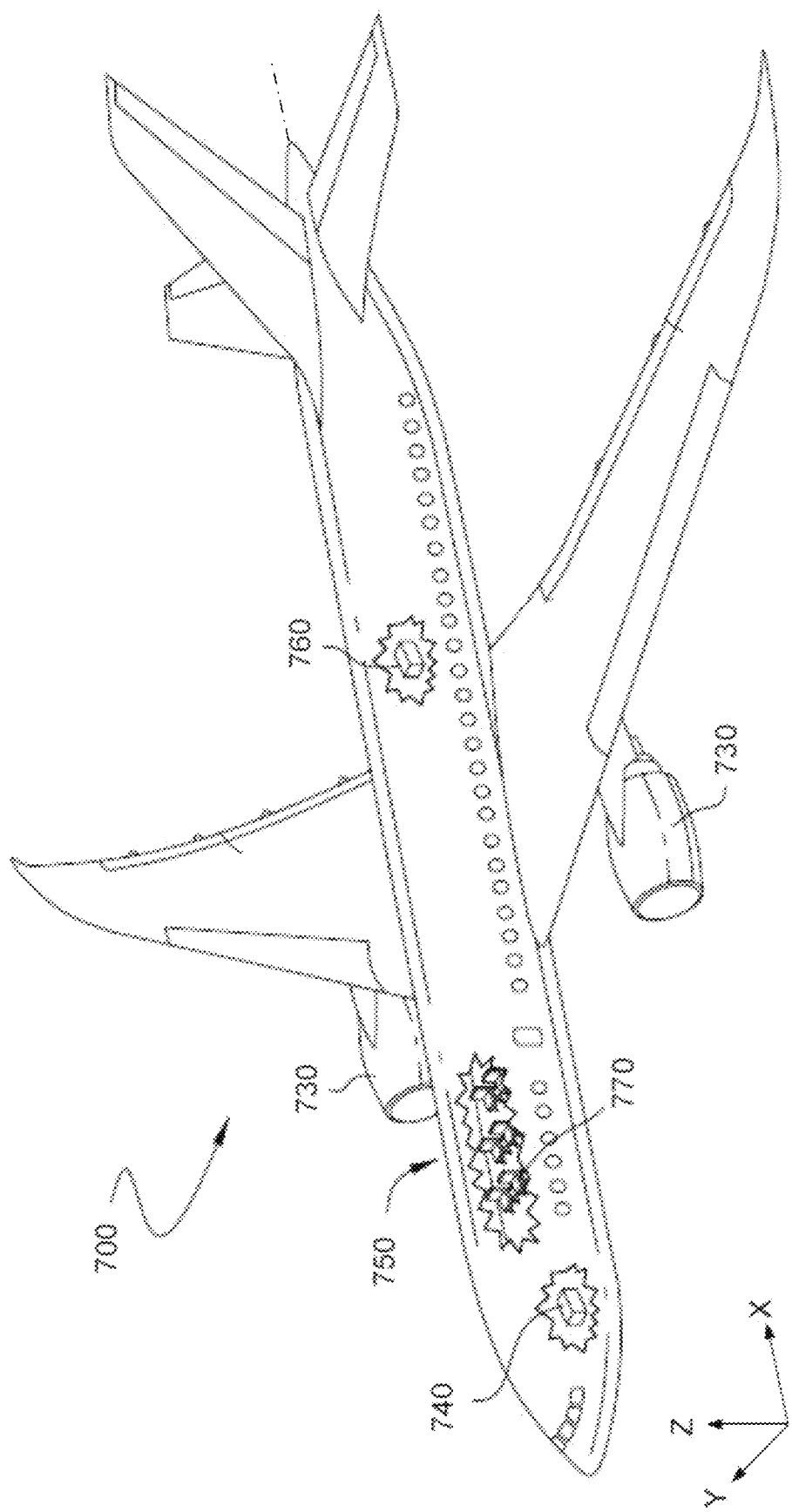

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a template for controlling application of material around a protuberance, according to one or more examples of the present disclosure;

FIG. 2A is a schematic, top view of the template of FIG. 1, according to one or more examples of the present disclosure;

FIG. 2B is a schematic, cross-sectional view of the template of FIGS. 1 and 2A, according to one or more examples of the present disclosure;

FIG. 2C is a schematic, cross-sectional view of a detail of the template of FIGS. 1 and 2B, according to one or more examples of the present disclosure;

FIG. 2D is a schematic, cross-sectional view of another detail of the template of FIGS. 1 and 2B, according to one or more examples of the present disclosure;

FIG. 2E is a schematic, top view of the template of FIG. 2D, according to one or more examples of the present disclosure, with the first portion removed;

FIG. 2F is a schematic, sectional view of a detail of the template of FIG. 2E, illustrating a visual material-placement indicator, according to one or more examples of the present disclosure;

FIG. 2G is a schematic, sectional view of a detail of the template of FIG. 2E, illustrating a visual material-placement indicator, according to one or more examples of the present disclosure;

FIG. 3A is a schematic, top view of the template of FIG. 1, according to one or more examples of the present disclosure;

FIG. 3B is a schematic, top view of the template of FIG. 1, according to one or more examples of the present disclosure;

FIG. 3C is a schematic, top view of the template of FIG. 1, according to one or more examples of the present disclosure, illustrating a square positioning opening;

FIG. 3D is a schematic, top view of the template of FIG. 1, according to one or more examples of the present disclosure, illustrating a positioning opening, extending to the second inner peripheral edge of the second portion;

FIGS. 4A and 4B are schematic, top views of the template of FIG. 1, according to examples of the present disclosure, illustrating a weakened region, extending to the second inner peripheral edge of the second portion;

FIG. 4C is a schematic, top view of the template of FIG. 1, according to one or more examples of the present disclosure, illustrating a vent opening, extending to the second inner peripheral edge of the second portion;

FIG. 4D is a schematic, top view of a detail of the template of FIG. 4C, illustrating a first-portion tab, extending over the second portion, according to one or more examples of the present disclosure;

FIG. 4E is a schematic, top view of a detail of the template of FIG. 1, illustrating a first-portion tab, extending over the second portion, according to one or more examples of the present disclosure;

FIG. 4F is a schematic, top view of the template of FIG. 1, illustrating a vent opening, extending to the second inner peripheral edge of the second portion, according to one or more examples of the present disclosure;

FIG. 4G is a schematic, top view of a detail of the template of FIG. 4F, illustrating a first-portion tab, extending over the second portion, according to one or more examples of the present disclosure;

FIG. 5 is a schematic, process flowchart showing various steps of a method of applying material to a workpiece around a protuberance, according to one or more examples of the present disclosure;

FIG. 6A is a schematic, top view of the workpiece with a protuberance, according to one or more examples of the present disclosure;

FIG. 6B is a schematic, cross-sectional view of the workpiece of FIG. 6A, according to one or more examples of the present disclosure;

FIG. 6C is a schematic, top view of a workpiece with a protuberance, inserted into a positioning opening of a template, according to one or more examples of the present disclosure;

FIG. 6D is a schematic, cross-sectional view of the workpiece and the template of FIG. 6C, with the template in contact with the workpiece, according to one or more examples of the present disclosure;

FIG. 6E is a schematic, top view of a workpiece and a template, according to one or more examples of the present disclosure, with the first portion of the template removed;

FIG. 6F is a schematic, cross-sectional view of the workpiece and the template of FIG. 6E, according to one or more examples of the present disclosure;

FIG. 6G is a schematic, top view of a workpiece and a template, according to one or more examples of the present disclosure, with material applied to the workpiece around the protuberance;

FIG. 6H is a schematic, cross-sectional view of the workpiece and the template of FIG. 6G, according to one or more examples of the present disclosure;

FIG. 6I is a schematic, top view of the workpiece of FIG. 6G, according to one or more examples of the present disclosure, with the material applied and the template removed;

FIG. 6J is a schematic, cross-sectional view of the workpiece of FIG. 6I, according to one or more examples of the present disclosure;

FIG. 7 is a schematic illustration of an aircraft; and

Figure 8:
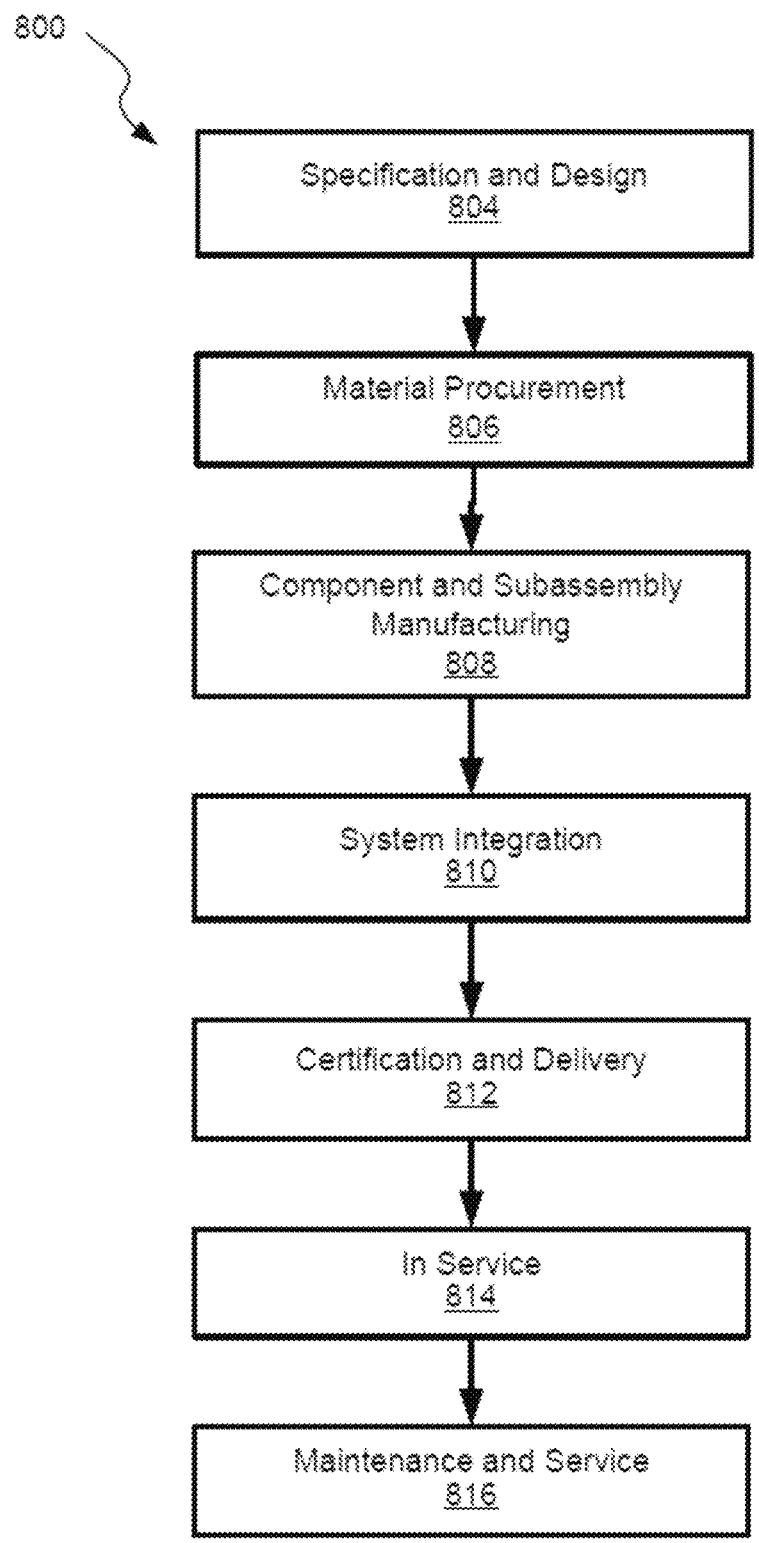

FIG. 8 is a block diagram of aircraft production and service methodology.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1, and particularly to, e.g., FIGS. 2A and 2B, template 100 for controlling application of material 620 around protuberance 610 is disclosed. Protuberance 610 extends from workpiece 600 and has base 612. Template 100 comprises first portion 110 and second portion 130, removably attached to first portion 110. First portion 110 comprises first inner peripheral edge 111 that at least partially defines positioning opening 115 and that is geometrically complementary to at least portion of base 612 of protuberance 610. First portion 110 further comprises first outer peripheral edge 113, opposite first inner peripheral edge 111. First portion 110 also comprises first-portion workpiece-facing surface 114 that is located between first inner peripheral edge 111 and first outer peripheral edge 113. First portion 110 additionally comprises first-portion environment-facing surface 116, located between first inner peripheral edge 111 and first outer peripheral edge 113 and opposite first-portion workpiece-facing surface 114. Second portion 130 comprises second inner peripheral edge 131 and second outer peripheral edge 133, opposite second inner peripheral edge 131. Second portion 130 further comprises second-portion workpiece-facing surface 134, defined between second inner peripheral edge 131 and second outer peripheral edge 133. Second portion 130 also comprises second-portion environment-facing surface 136, defined between second inner peripheral edge 131 and second outer peripheral edge 133 and opposite second-portion workpiece-facing surface 134. Second-portion environment-facing surface 136 partially overlaps with and is removably attached to first-portion workpiece-facing surface 114, forming interface 120 between first-portion workpiece-facing surface 114 and second-portion environment-facing surface 136. Second portion 130 additionally comprises visual material-placement indicator 170, located on second-portion environment-facing surface 136. Second portion 130 also comprises adhesive layer 160, located on at least portion of second-portion workpiece-facing surface 134. The preceding subject matter of this paragraph characterizes example 1 of the present disclosure.

Template 100 uses first portion 110 to control orientation of template 100 relative to workpiece 600 or, more specifically, relative to protuberance 610 extending from workpiece 600. Specifically, first inner peripheral edge 111, which at least partially defines positioning opening 115, is geometrically complementary to at least a portion of base 612 of protuberance 610. Protuberance 610 is inserted into positioning opening 115, and template 100 is advanced toward base 612 of protuberance 610 until first inner peripheral edge 111 is in contact with base 612. At this point, the orientation of template 100 relative to workpiece 600 is at least partially set since positioning opening 115 is geometrically complementary to at least the portion of base 612. It should be noted that second portion 130 is removably attached to first portion at this point. As such, template 100, in its entirety, is oriented relative to workpiece 600 using first inner peripheral edge 111.

Once the desired orientation of template 100 relative to workpiece 600 is achieved, second portion 130 of template 100 is removably attached to workpiece 600. Specifically, second portion 130 comprises adhesive layer 160, located on at least a portion of second-portion workpiece-facing surface 134. Adhesive layer 160 comes in contact with workpiece 600, which removably attaches template 100 or, more specifically, second portion 130 to workpiece 600. This removable attaching of second portion 130 to workpiece 600 preserves the orientation without a need for first portion 110, which is removed after this attachment.

The separation and removal of first portion 110 provides access to the part of workpiece 600 around protuberance 610, which later receives material 620. Second inner peripheral edge 131 separates an exposed part of workpiece 600 that will receive material 620 from a covered part that will not receive material 620, thereby controlling where material 620 is applied. It should be noted that second portion 130 maintains its orientation relative to workpiece 600 achieved during these processing steps. As such, second inner peripheral edge 131 also has specific orientation relative to workpiece 600.

Second portion 130 also comprises visual material-placement indicator 170, located on second-portion environment-facing surface 136, which indicates how far material 620 is allowed to extend over second portion 130 when material 620 is applied to workpiece 600. In some examples, material 620 is applied in such a manner that material 620 extends over second inner peripheral edge 131 and up to visual material-placement indicator 170. For example, material 620 does not overlap visual material-placement indicator 170. This approach ensures that material 620 covers the entire designated part of workpiece 600 around protuberance 610, but that material 620 does not form outer edge 621 that is excessively high. Outer edge 621 is formed when template 100 or, more specifically, second portion 130 is removed from workpiece 600 as schematically shown, for example, in FIGS. 6G-6J.

In some examples, first portion 110 and second portion 130 are fabricated as separate components and then attached to each other. For example, first portion 110 and second portion 130 are welded, adhered, or otherwise attached to each other forming interface 120 between first-portion workpiece-facing surface 114 and second-portion environment-facing surface 136. In some examples, first portion 110 and second portion 130 have different thicknesses, different compositions, and/or other features. For example, second portion 130 has adhesive layer 160, located on at least a portion of second-portion workpiece-facing surface 134, while first portion 110 is adhesive free, at least away from interface 120.

The removable attachment of first portion 110 and second portion 130 enables separating first portion 110 from second portion 130, while second portion 130 remains attached to and aligned with respect to workpiece 600. In some examples, the force, required to separate first portion 110 from second portion 130, is less than the force required to detach second portion 130 from workpiece 600 or even move second portion 130 relative to workpiece 600.

First portion 110 comprises first inner peripheral edge 111 that at least partially defines positioning opening 115. First inner peripheral edge 111 precisely locates, at least radially, first portion 110 and the rest of template 100 relative to workpiece 600. Specifically, first inner peripheral edge 111 contacts base 612 of protuberance 610 when protuberance 610 is inserted into positioning opening 115. First inner peripheral edge 111 is geometrically complementary to at least a portion of base 612 of protuberance 610, thereby providing the alignment. In some examples, first inner peripheral edge 111 represents at least 60% of the perimeter of positioning opening 115 or, more specifically, at least 70% of the perimeter of positioning opening 115, or, even more specifically, at least 80% of the perimeter of positioning opening 115, or still more specifically, at least 90% of the perimeter of positioning opening 115. When first inner peripheral edge 111 is circumferentially closed, first inner peripheral edge 111 represents 100% of the perimeter of positioning opening 115.

Second portion 130 comprises adhesive layer 160, located on at least a portion of second-portion workpiece-facing surface 134. In some examples, adhesive layer 160 covers second-portion workpiece-facing surface 134 in its entirety and extends to both second inner peripheral edge 131 and second outer peripheral edge 133. In some examples, when template 100 is fabricated, selective deposition of adhesive layer 160 (e.g., printing) is used. With the selective deposition, adhesive layer 160 is placed on second-portion workpiece-facing surface 134, but not on first-portion workpiece-facing surface 114. In some examples, adhesive layer 160 is a pressure-sensitive adhesive (PSA) or, more specifically, a low-tack PSA.

Second portion 130 comprises visual material-placement indicator 170, located on second-portion environment-facing surface 136. For example, visual material-placement indicator 170 is a marking or a feature that either projects outwardly relative to second-portion environment-facing surface 136 or is inwardly recessed relative to second-portion environment-facing surface 136. The offset of visual material-placement indicator 170 from second inner peripheral edge 131 determines how far material 620 extends over second portion 130 or, more specifically, over second-portion environment-facing surface 136 of second portion 130.

Referring generally to FIG. 1, and particularly to, e.g., FIGS. 2C and 2D, interface 120 extends between first outer peripheral edge 113 of first portion 110 and second inner peripheral edge 131 of second portion 130. The preceding subject matter of this paragraph characterizes example 2 of the present disclosure, wherein example 2 also includes the subject matter according to example 1, above.

Interface 120 determines the overlap area between first portion 110 and second portion 130 or, more specifically, between second-portion environment-facing surface 136 and first-portion workpiece-facing surface 114. Increasing the size of interface 120 provides for stronger support and attachment between second-portion environment-facing surface 136 and first-portion workpiece-facing surface 114. Alternatively, reducing the size of interface 120 leads to a smaller force required to remove first portion 110 from second portion 130, during operation of template 100.

In some examples, first outer peripheral edge 113 of first portion 110 and second inner peripheral edge 131 of second portion 130 are concentric and geometrically similar, which results in the width of interface 120 being constant along the entire perimeter of first outer peripheral edge 113 of first portion 110. Alternatively, the width of interface 120 varies along the perimeter of first outer peripheral edge 113 of first portion 110. In some examples, the width of interface 120 is between about 1 millimeter and about 5 millimeters or, more specifically, between about 2 millimeters and about 4 millimeters, on average.

Referring generally to FIG. 1, and particularly to, e.g., FIG. 2C, interface 120 comprises weld 121, located between first outer peripheral edge 113 of first portion 110 and second inner peripheral edge 131 of second portion 130. Weld 121 joins first portion 110 and second portion 130. The preceding subject matter of this paragraph characterizes example 3 of the present disclosure, wherein example 3 also includes the subject matter according to example 1 or 2, above.

Weld 121 is used to join first portion 110 and second portion 130 and, more specifically, to support second portion 130 relative to first portion 110. This support between first portion 110 and second portion 130 is needed when template 100 is aligned relative to workpiece 600 by inserting protuberance 610 into positioning opening 115. This support ensures that second portion 130 is also aligned relative to workpiece 600, which enables first portion 110 to be removed, exposing a part of workpiece 600 around protuberance 610, and material 620 to be applied around protuberance 610 in a manner controlled by second inner peripheral edge 131 of second portion.

In some examples, weld 121 is positioned at first outer peripheral edge 113 of first portion 110, at second inner peripheral edge 131, or anywhere between and away from first outer peripheral edge 113 and second inner peripheral edge 131. In some examples, weld 121, which is positioned at first outer peripheral edge 113 or at second inner peripheral edge 131, is formed externally (e.g., without penetrating first portion 110 or second portion 130). In more specific examples, weld 121 extends over first-portion workpiece-facing surface 114 or over second-portion environment-facing surface 136, respectively. Alternatively, weld 121, which is positioned between and away from first outer peripheral edge 113 and second inner peripheral edge 131, is formed through either first portion 110 or second portion 130. In some examples, weld 121 is formed using hot gas welding, extrusion welding, contact welding, hot-plate welding, high-frequency (HF) welding, induction welding, injection welding, ultrasonic welding, friction welding, spin welding, laser welding, or solvent welding. However, other welding techniques are also within the scope.

Referring generally to FIG. 1, and particularly to, e.g., FIGS. 2A and 2C, weld 121 is a continuous weld. The preceding subject matter of this paragraph characterizes example 4 of the present disclosure, wherein example 4 also includes the subject matter according to example 3, above.

Weld 121, when it is continuous, provides constant and uninterrupted support to second portion 130 relative to first portion 110. More specifically, support is provided along the entire perimeter or length of weld 121. This support is relied on when template 100 is aligned relative to workpiece 600 by inserting protuberance 610 into positioning opening 115. This support ensures that second portion 130 is also aligned relative to workpiece 600, which enables first portion 110 to be removed, exposing a part of workpiece 600 around protuberance 610, and material 620 to be applied around protuberance 610 in a manner controlled by second inner peripheral edge 131 of second portion.

In some examples, weld 121, which is a continuous weld, is formed using hot gas welding, extrusion welding, contact welding, hot-plate welding, high-frequency (HF) welding, induction welding, injection welding, ultrasonic welding, friction welding, spin welding, laser welding, or solvent welding. This type of weld 121 is circumferentially closed. Alternatively, weld 121 is circumferentially open and remains continuous between the ends of weld 121.

Referring generally to FIG. 1, and particularly to, e.g., FIGS. 2A and 2C, weld 121 is circumferentially closed. The preceding subject matter of this paragraph characterizes example 5 of the present disclosure, wherein example 5 also includes the subject matter according to example 4, above.

Weld 121, which is circumferentially closed, provides support to second portion 130 relative to first portion 110. Specifically, this support is complete and continuous around positioning opening 115. This support is relied on when template 100 is aligned relative to workpiece 600 by inserting protuberance 610 into positioning opening 115. This support ensures that second portion 130 is also aligned relative to workpiece 600, which enables first portion 110 to be removed to expose a part of workpiece 600 around protuberance 610.

In some examples, weld 121, which is circumferentially closed, is formed using hot gas welding, extrusion welding, contact welding, hot-plate welding, high-frequency (HF) welding, induction welding, injection welding, ultrasonic welding, friction welding, spin welding, laser welding, or solvent welding. When weld 121 is circumferentially closed, there are no locations along the weld to initiate separation of first portion 110 from second portion 130. As such, first portion 110 is better supported relative to second portion 130 and vice versa than, for example, when weld 121 is circumferentially open.

Referring generally to FIG. 1, and particularly to, e.g., FIG. 2C, weld 121 is an intermittent weld. The preceding subject matter of this paragraph characterizes example 6 of the present disclosure, wherein example 6 also includes the subject matter according to example 3, above.

Weld 121, which is an intermittent weld, provides support to second portion 130 relative to first portion 110. At the same time, this type of weld 121 enables first portion 110 to be easily separated from second portion 130. A part of workpiece 600 around protuberance 610 is exposed when first portion 110 is removed. When weld 121 is as intermittent weld, there are multiple locations along weld 121 that enable the separation of first portion 110 from second portion 130 to be initiated.

In some examples, weld 121, which is an intermittent weld, is formed using hot gas welding, extrusion welding, contact welding, hot-plate welding, high-frequency (HF) welding, induction welding, injection welding, ultrasonic welding, friction welding, spin welding, laser welding, or solvent welding. In some examples, weld 121, which is an intermittent weld, is circumferentially closed, not accounting for gaps between each pair of adjacent weld spots. Alternatively, weld 121, which is an intermittent weld, is circumferentially open.

Referring generally to FIG. 1, and particularly to, e.g., FIG. 2D, interface 120 comprises interface adhesive layer 123, located between and directly contacting portions of first-portion workpiece-facing surface 114 and second-portion environment-facing surface 136. The preceding subject matter of this paragraph characterizes example 7 of the present disclosure, wherein example 7 also includes the subject matter according to example 1 or 2, above.

Interface adhesive layer 123 joins first portion 110 and second portion 130 and, more specifically, supports second portion 130 relative to first portion 110. This support is relied on when template 100 is aligned relative to workpiece 600 by inserting protuberance 610 into positioning opening 115. This support ensures that second portion 130 is also aligned relative to workpiece 600, which enables first portion 110 to be removed to expose a part of workpiece 600 around protuberance 610.

In some examples, interface adhesive layer 123 extends to first outer peripheral edge 113 of first portion 110 (but not to second inner peripheral edge 131 of second portion 130), extends to second inner peripheral edge 131 (but not to first outer peripheral edge 113), positioned between and away from first outer peripheral edge 113 and second inner peripheral edge 131, positioned between and extends to both first outer peripheral edge 113 and second inner peripheral edge 131. Another example is shown in FIG. 2D, illustrating a case where interface adhesive layer 123 forms interface 120 in its entirety. In this example, second portion 130 and first portion 110 have the greatest adhesive contact area in comparison to examples when interface adhesive layer 123 forms only a part of interface 120. In some examples, interface adhesive layer 123 is a pressure sensitive adhesive (PSA) layer.

Referring generally to FIG. 1, and particularly to, e.g., FIG. 2A, interface 120 has an annular shape. The preceding subject matter of this paragraph characterizes example 8 of the present disclosure, wherein example 8 also includes the subject matter according to any one of examples 1 to 7, above.

Interface 120, which has an annular shape, provides continuous support to second portion 130 relative to first portion 110 along the entire perimeter of either first outer peripheral edge 113 of first portion 110 or second inner peripheral edge 131 of second portion 130. This support is relied on when template 100 is aligned relative to workpiece 600 by inserting protuberance 610 into positioning opening 115. This support ensures that second portion 130 is also aligned relative to workpiece 600, which enables first portion 110 to be removed to expose a part of workpiece 600 around protuberance 610.

In some examples, interface 120, which has an annular shape, has a constant width along the entire perimeter of first outer peripheral edge 113 of first portion 110. Alternatively, the width of interface 120 varies along the perimeter of first outer peripheral edge 113 of first portion 110. In some examples, the width of interface 120 is between about 1 millimeter and about 5 millimeters or, more specifically, between about 2 millimeters and about 4 millimeters, on average.

Referring generally to FIG. 1, and particularly to, e.g., FIG. 3B, second inner peripheral edge 131 of second portion 130 follows a line, comprising straight segment 125. The preceding subject matter of this paragraph characterizes example 9 of the present disclosure, wherein example 9 also includes the subject matter according to any one of examples 1 to 7, above.

The shape of second inner peripheral edge 131 determines the footprint of material 620, when material 620 is deposited onto workpiece 600. Second inner peripheral edge 131 that follows the line, comprising straight segment 125, results in outer edge 621 of material 620 also comprising a corresponding straight segment. The straight segment of outer edge 621 is used, in some examples, to accommodate additional components near outer edge 621 or when outer edge 621 is used, for example, for angular alignment of workpiece 600 relative to other components.

FIG. 3B illustrates an example of template 100 with second inner peripheral edge 131 following a line, comprising straight segment 125. This shape of second inner peripheral edge 131 is also referred to as an oval with two straight sides. All straight segments of second inner peripheral edge 131 represent, for example, between about 10% and about 90% of the perimeter of second inner peripheral edge 131 or, more specifically, between about 25% and about 75% of the perimeter of the second inner peripheral edge. In some examples, second inner peripheral edge 131 follows a line, straight segment 125, while the rest of the line is not straight. The rest of the line is formed by one or more curved segments, for example. Alternatively, second inner peripheral edge 131 follows a line, comprising only two straight segments as shown, for example, in FIG. 2G. In some examples, second inner peripheral edge 131 follows a line consisting of only straight segments, e.g., second inner peripheral edge 131 has a shape of a triangle, rectangle, pentagon, and so on.

Referring generally to FIG. 1, and particularly to, e.g., FIG. 3B, second inner peripheral edge 131 of second portion 130 follows a line, comprising curved segment 127. The preceding subject matter of this paragraph characterizes example 10 of the present disclosure, wherein example 10 also includes the subject matter according to any one of examples 1 to 9, above.

The shape of second inner peripheral edge 131 determines the footprint of material 620 when material 620 is deposited onto workpiece 600. Second inner peripheral edge 131 that follows the line, comprising curved segment 127, results in outer edge 621 of material 620 also comprising a corresponding curved segment. In some examples, the curved segment of material 620 is used to eliminate sharp corners on outer edge 621, and avoid obstacles (e.g., when protuberance 610 is positioned near other components).

FIG. 3B illustrates an example of template 100 with second inner peripheral edge 131 following a line, comprising curved segment 127. This shape of second inner peripheral edge 131 is referred to as an oval with two straight sides. Material 620, deposited using this example of template 100, will also have a corresponding curved segment on outer edge 621. For example, the minimum radius of curved segment 127 is at least about 5 millimeters or, more specifically, at least about 10 millimeters, or, even more specifically, at least about 15 millimeters. This minimum radius is used to prevent various effects of sharp corners, for example.

Referring generally to FIG. 1, and particularly to, e.g., FIG. 3A, second inner peripheral edge 131 of second portion 130 follows a curvilinear line. The preceding subject matter of this paragraph characterizes example 11 of the present disclosure, wherein example 11 also includes the subject matter according to any one of examples 1 to 7, above.

The shape of second inner peripheral edge 131 determines, at least in part, the shape of second inner peripheral edge 131, which is, at least in part, formed when first portion 110 is separated from second portion 130. The shape of second inner peripheral edge 131 determines the footprint of material 620 when material 620 is deposited onto workpiece 600. In some examples, second inner peripheral edge 131 that follows a curvilinear line is used to eliminate sharp corners on outer edge 621 and avoid obstacles (e.g., when protuberance 610 is positioned near other components).

FIG. 3A illustrates an example of template 100 with second inner peripheral edge 131 following a curvilinear line. Material 620 deposited using this example of template 100 will also have a corresponding curvilinear segment on outer edge 621. The minimum curvature radius of this curvilinear line is at least about 5 millimeters or, more specifically, at least about 10 millimeters or, even more specifically, at least about 15 millimeters. This minimum radius is used to prevent effects of sharp corners, in some examples.

Referring generally to FIG. 1, and particularly to, e.g., FIG. 2A, first inner peripheral edge 111 of first portion 110 is circumferentially closed. The preceding subject matter of this paragraph characterizes example 12 of the present disclosure, wherein example 12 also includes the subject matter according to any one of examples 1 to 11, above.

When first inner peripheral edge 111 is circumferentially closed, first inner peripheral edge 111 is used, in some examples, in its entirety for alignment of template 100 on protuberance 610 or, more specifically, on base 612 of protuberance 610. This circumferentially closed feature ensures precise alignment of template 100 relative to workpiece 600 since first inner peripheral edge 111, in its entirety, is available for alignment. This feature enables the use of softer and/or thinner materials for template 100. When positioning opening 115 is fully defined by first inner peripheral edge 111 that is circumferentially closed, positioning opening 115 is more likely to maintain its shape than, for example, when positioning opening 115 is only partially defined by a circumferentially open edge.

In some examples, first inner peripheral edge 111 that is circumferentially closed is formed using a mechanical cutter (e.g., a die cutter), a laser cutter, or other types of cutting/material-removal tools. For example, a part corresponding to positioning opening 115 is punched out or otherwise removed from sheet 210 to form first inner peripheral edge 111. In some examples, first inner peripheral edge 111 that is circumferentially closed has any shape, such as circular (e.g., FIG. 3D) or non-circular (e.g., FIG. 3C).

Referring generally to FIG. 1, and particularly to, e.g., FIG. 2A, template 100 further comprises visual template-alignment indicator 180, located on at least one of first-portion environment-facing surface 116 or second-portion environment-facing surface 136. The preceding subject matter of this paragraph characterizes example 13 of the present disclosure, wherein example 13 also includes the subject matter according to any one of examples 1 to 12, above.

Visual template-alignment indicator 180 is used, in some examples, for angular alignment of template 100 relative to workpiece 600 before removably attaching template 100 to workpiece 600. While a combination of first inner peripheral edge 111 and base 612 of protuberance 610 provides the radial alignment, template 100 is still able to be rotated relative to workpiece 600 in some examples. In these examples, further angular alignment is performed using visual template-alignment indicator 180. Decoupling the angular alignment from the radial alignment provides more precision during the overall alignment.

Further angular alignment is performed using visual template-alignment indicator 180 when at least one of positioning opening 115 or protuberance 610 has a circular cross-sectional profile that allows template 100 to be rotated relative to protuberance 610. For example, protuberance 610 has a circular cross-sectional profile, while positioning opening 115 has a square cross-sectional profile. In this example, template 100 can still rotate relative to protuberance 610 and to workpiece 600.

In some examples, a user relies on visual template-alignment indicator 180 for angular alignment and aligns visual template-alignment indicator 180 with one or more alignment features 615 on workpiece 600 as shown, for example, in FIG. 6C. Alignment features 615 are, for example, markings (line(s), stripe(s), one or more dots), protrusions, indents, and the like, on workpiece 600. In some examples, alignment features 615 of workpiece 600 are positioned on protuberance 610 (e.g., at base 612 and near first inner peripheral edge 111), outside of the footprint of template 100 and near second outer peripheral edge 133 (as shown, for example, in FIG. 6C), or within the footprint of template 100 (in which case, template 100 is transparent). The position of visual template-alignment indicator 180 on template 100 depend, for example, on the position of one or more alignment features 615 on workpiece 600. Visual template-alignment indicator 180, for example, is a line formed by printing, marking, engraving, and the like.

Referring generally to FIG. 1, and particularly to, e.g., FIGS. 2A, 3A, 3B, and 6C, visual template-alignment indicator 180 extends to first inner peripheral edge 111 of first portion 110. The preceding subject matter of this paragraph characterizes example 14 of the present disclosure, wherein example 14 also includes the subject matter according to example 13, above.

Proximity of visual template-alignment indicator 180 and alignment feature 615 on workpiece 600 determines precision of the angular alignment of template 100 relative to workpiece 600. The angular alignment will generally be more precise and the alignment step is performed faster when, for example, an end of visual template-alignment indicator 180 is positioned right next to alignment feature 615 rather than being separated. With the separation between visual template-alignment indicator 180 and alignment feature 615, the user has to estimate the alignment, which makes the alignment operation less precise.

In some examples, alignment feature 615 of workpiece 600 is positioned on protuberance 610 and near first inner peripheral edge 111. In these examples, visual template-alignment indicator 180 extends to first inner peripheral edge 111 to ensure precise angular alignment. In some examples, visual template-alignment indicator 180, which extends to first inner peripheral edge 111, is printed, engraved, marked, or otherwise positioned on at least first-portion environment-facing surface 116. Visual template-alignment indicator 180 extends, for example, to both first inner peripheral edge 111 and second outer peripheral edge 133 at the same time as shown, for example, in FIG. 2A.

Referring generally to FIG. 1, and particularly to, e.g., FIGS. 2A and 6C, visual template-alignment indicator 180 extends to second outer peripheral edge 133 of second portion 130. The preceding subject matter of this paragraph characterizes example 15 of the present disclosure, wherein example 15 also includes the subject matter according to example 13 or 14, above.

Proximity of visual template-alignment indicator 180 and alignment feature 615 on workpiece 600 determines precision of the angular alignment of template 100 relative to workpiece 600. The angular alignment will generally be more precise and the alignment step is performed faster when, for example, an end of visual template-alignment indicator 180 is positioned right next to alignment feature 615 rather than being separated. With the separation between visual template-alignment indicator 180 and alignment feature 615, the user has to estimate the alignment, which reduces precision.

In some examples, alignment feature 615 of template 100 is positioned outside of the footprint of template 100 and near second outer peripheral edge 133 as shown, for example, in FIG. 6C. In these examples, visual template-alignment indicator 180 extends to second outer peripheral edge 133 to ensure angular-alignment precision. Visual template-alignment indicator 180, which extends to second outer peripheral edge 133 is, for example, printed, engraved, marked, or otherwise positioned on at least second-portion environment-facing surface 136. In some examples, visual template-alignment indicator 180, which extends to second outer peripheral edge 133, also extends to first inner peripheral edge 111 as shown, for example, in FIG. 2A. Alternatively, visual template-alignment indicator 180, which extends to second outer peripheral edge 133, does not extend to first inner peripheral edge 111 as shown, for example, in FIG. 4A.

Referring generally to FIG. 1, and particularly to, FIG. 2A, positioning opening 115 is circular. The preceding subject matter of this paragraph characterizes example 16 of the present disclosure, wherein example 16 also includes the subject matter according to any one of examples 1 to 15, above.

The shape of positioning opening 115 ensures at least the radial alignment of template 100 relative to workpiece 600. Positioning opening 115 that is circular accommodates different cross-sectional shapes of base 612, such as a round shape, an oval shape, a square shape, or any regular polygon, i.e., a polygon that is equiangular (all angles are equal in measure) and equilateral (all sides have the same length). Furthermore, positioning opening 115 that is circular enables rotation of template 100 relative to workpiece 600 even after protuberance 610 is inserted in positioning opening 115.

In some examples, positioning opening 115 that is circular is formed using a mechanical cutter (e.g., a die cutter), a laser cutter, or other types of cutting/material-removal tools. For example, a round part corresponding to positioning opening 115 is punched out or otherwise removed from sheet 210 to form first inner peripheral edge 111. The diameter of positioning opening 115 is, for example, between about 10% and about 90% of the diameter (or the largest dimension) of second inner peripheral edge 131 or, more specifically, between about 25% and about 75% of the diameter or, even more specifically, between about 40% and about 60% of the diameter of the second inner peripheral edge. Positioning opening 115 that is circular is, for example, only partially defined by first inner peripheral edge 111 that is circumferentially open and is joined with at least one vent opening 118 as shown, for example, in FIG. 2D. Alternatively, positioning opening 115 that is circular is fully defined by first inner peripheral edge 111 that is circumferentially closed.

Referring generally to FIG. 1, and particularly to, e.g., FIG. 3C, positioning opening 115 is non-circular. The preceding subject matter of this paragraph characterizes example 17 of the present disclosure, wherein example 17 also includes the subject matter according to any one of examples 1 to 15, above.

The shape of positioning opening 115 ensures at least the radial alignment of template 100 relative to workpiece 600. Positioning opening 115 that is circular, accommodates different cross-sectional shapes of base 612, such as a round shape, an oval shape, a square shape, or any regular polygon, i.e., a polygon that is equiangular (all angles are equal in measure) and equilateral (all sides have the same length). Furthermore, positioning opening 115 that is circular enables rotation of template 100 relative to workpiece 600 even after protuberance 610 is inserted in positioning opening 115.

Specifically, when both positioning opening 115 and the cross-sectional shape of protuberance 610 are non-circular, template 100 is not able to rotate relative to protuberance 610 around the center axis of protuberance 610. In other words, a combination of non-circular shapes of positioning opening 115 and the cross-sectional shape of protuberance 610 is used to set the angular orientation of template 100 relative to protuberance 610.

Positioning opening 115 that is non-circular is formed using a mechanical cutter (e.g., a die cutter), a laser cutter, or other types of cutting/material-removal tools. For example, a non-round part, corresponding to positioning opening 115, is punched out or otherwise removed from sheet 210 to form first inner peripheral edge 111. The largest dimension of positioning opening 115 is, for example, between about 10% and about 90% of the diameter (or the largest dimension) of second inner peripheral edge 131 or, more specifically, between about 25% and about 75% of the diameter of the second inner peripheral edge or, even more specifically, between about 40% and about 60% of the diameter of the second inner peripheral edge.

In some examples, positioning opening 115 that is non-circular is only partially defined by first inner peripheral edge 111 that is circumferentially open. In these examples, positioning opening 115 is open to at least one vent opening 118. Alternatively, positioning opening 115 that is non-circular is fully defined by first inner peripheral edge 111 that is circumferentially closed.

Referring generally to FIG. 1, and particularly to, e.g., FIG. 4C, first inner peripheral edge 111 of first portion 110 is circumferentially open. The preceding subject matter of this paragraph characterizes example 18 of the present disclosure, wherein example 18 also includes the subject matter according to any one of examples 1 to 17, above.

When first inner peripheral edge 111 of first portion 110 is circumferentially open, positioning opening 115 is open to at least one vent opening 118 as, for example, shown in FIG. 4C. As a result, at least one vent opening 118 is also circumferentially open, which is used to assist with separating first portion 110 of template 100 from second portion 130. Furthermore, in this example, at least one vent opening 118 enables a gaseous substance to flow therethrough near protuberance 610. Furthermore, positioning opening 115 is more flexible when first inner peripheral edge 111 of first portion 110 is circumferentially open, rather than when first inner peripheral edge 111 is circumferentially closed. This feature provides flexibility when protuberance 610 is inserted into positioning opening 115.

In some examples, first inner peripheral edge 111 of first portion 110, and as a result, positioning opening 115 are formed using a mechanical cutter (e.g., a die cutter), a laser cutter, or other types of cutting/material-removal tools. In some examples, positioning opening 115 is formed in the same step with forming at least one vent opening 118.

Referring generally to FIG. 1, and particularly to, e.g., FIG. 2E, first inner peripheral edge 111 of first portion 110 extends to first outer peripheral edge 113 of first portion 110. The preceding subject matter of this paragraph characterizes example 19 of the present disclosure, wherein example 19 also includes the subject matter according to example 18, above.

First inner peripheral edge 111 extending to first outer peripheral edge 113 forms a channel between first inner peripheral edge 111 and first outer peripheral edge 113, which, in one example, serves as at least one vent opening 118. Furthermore, first inner peripheral edge 111 that extends to first outer peripheral edge 113 simplifies separation of first portion 110 relative to second portion 130 by enabling first portion 110 to be peeled off around positioning opening 115.

In some examples, first inner peripheral edge 111 of first portion 110, and as a result, positioning opening 115 are formed using a mechanical cutter (e.g., a die cutter), a laser cutter, or other types of cutting/material-removal tools. In some examples, positioning opening 115 is formed in the same step with forming at least one vent opening 118.

Referring generally to FIG. 1, and particularly to, e.g., FIGS. 2A and 4A-4C, both positioning opening 115 and second inner peripheral edge 131 of second portion 130 are circular. The preceding subject matter of this paragraph characterizes example 20 of the present disclosure, wherein example 20 also includes the subject matter according to any one of examples 1 to 8, 10 to 16, 18, and 19, above.

The shape of second inner peripheral edge 131 determines outer edge 621 of material 620. The shape of positioning opening 115 is selected based on the cross-sectional shape of protuberance 610 or, more specifically, on the cross-sectional shape of base 612 of protuberance 610 to ensure at least the radial alignment of template 100 relative to protuberance 610. Protuberance 610 also determines the inner edge of material 620. When both positioning opening 115 and second inner peripheral edge 131 are circular, the inner and outer edges of material 620 are also circular to ensure sealing, support, and other properties that material 620 provides to workpiece 600.

In some examples, second inner peripheral edge 131 that is circular is formed using a mechanical cutter (e.g., a die cutter), a laser cutter, or other types of cutting/material-removal tools. Second inner peripheral edge 131 that is circular is formed as sheet 210 is being rolled from one roll to another roll, e.g., in a roll-to-roll process. Positioning opening 115 that is circular is also formed using, for example, a mechanical cutter (e.g., a die cutter), a laser cutter, or other types of cutting/material-removal tools. The diameter of positioning opening 115 is, for example, between about 10% and about 90% of the diameter of second inner peripheral edge 131 or, more specifically, between about 25% and about 75% of the diameter of the second inner peripheral edge or, even more specifically, between about 40% and about 60% of the diameter of the second inner peripheral edge. In some examples, positioning opening 115 that is circular is only partially defined by first inner peripheral edge 111 that is circumferentially open, as shown, for example, in FIG. 4D.

Referring generally to FIG. 1, and particularly to, e.g., FIGS. 2A, 3B-3D, and 4A-4C, positioning opening 115 and second inner peripheral edge 131 of second portion 130 are concentric. The preceding subject matter of this paragraph characterizes example 21 of the present disclosure, wherein example 21 also includes the subject matter according to any one of examples 1 to 8, 10 to 16, and 18 to 20, above.

The shape of second inner peripheral edge 131 determines outer edge 621 of material 620. The shape of positioning opening 115 is selected based on the cross-sectional shape of protuberance 610 or, more specifically, on the cross-sectional shape of base 612 of protuberance 610 to ensure at least the radial alignment of template 100 relative to protuberance 610 or, more generally, relative to template 100. In some examples, the shape of positioning opening 115 coincides with the cross-sectional shape of base 612 of protuberance 610. Protuberance 610 also determines the inner edge of material 620. When both positioning opening 115 and second inner peripheral edge 131 are concentric, the inner and outer edges of material 620 are also concentric. Further, when both positioning opening 115 and second inner peripheral edge 131 are concentric and have the same shape (e.g., both are circular), the width of material 620 around protuberances 610 is uniform, for example.

In some examples, second inner peripheral edge 131 and positioning opening 115 that are concentric are formed using a mechanical cutter a die cutter), a laser cutter, or other types of cutting/material-removal tools. In some examples, second inner peripheral edge 131 and positioning opening 115 are formed in the same step during fabrication of template 100. The diameter of positioning opening 115 is, for example, between about 10% and about 90% of the diameter of second inner peripheral edge 131 or, more specifically, between about 25% and about 75% of the diameter of the second inner peripheral edge or, even more specifically, between about 40% and about 60% of the diameter of the second inner peripheral edge. In some examples, second inner peripheral edge 131 and positioning opening 115 that are concentric both have the same shape, e.g., are both circular, as shown in FIG. 2A. Alternatively, second inner peripheral edge 131 and positioning opening 115 that are concentric have different shapes as shown, for example, in FIGS. 2G and 2H.

Referring generally to FIG. 1, and particularly to, e.g., FIGS. 2A and 4A-4C, at least a portion of first inner peripheral edge 111 of first portion 110 and at least a portion of second inner peripheral edge 131 of second portion 130 are geometrically similar. The preceding subject matter of this paragraph characterizes example 22 of the present disclosure, wherein example 22 also includes the subject matter according to example 21, above.

The shape of second inner peripheral edge 131 determines outer edge 621 of material 620. The shape of positioning opening 115 is selected based on the cross-sectional shape of protuberance 610 or, more specifically, on the cross-sectional shape of base 612 of protuberance 610, to ensure at least the radial alignment of template 100 relative to protuberance 610 or, more generally, relative to template 100. In some examples, the shape of positioning opening 115 coincides with the cross-sectional shape of base 612 of protuberance 610. Protuberance 610 also determines the inner edge of material 620. When both positioning opening 115 and second inner peripheral edge 131 are geometrically similar, the inner and outer edges of material 620 are also geometrically similar. Further, when both positioning opening 115 and second inner peripheral edge 131 are concentric, the width of material 620 around protuberances 610 is uniform, in some examples.

In some examples, second inner peripheral edge 131 and positioning opening 115 that are geometrically similar are formed using a mechanical cutter (e.g., a die cutter), a laser cutter, or other types of cutting/material-removal tools. The largest dimension (e.g., the diameter) of positioning opening 115 is, for example, between about 10% and about 90% of the largest dimension (e.g., the diameter) of second inner peripheral edge 131 or, more specifically, between about 25% and about 75% of the largest dimension of the second inner peripheral edge or, even more specifically, between about 40% and about 60% of the largest dimension of the second inner peripheral edge. Second inner peripheral edge 131 and positioning opening 115 that are concentric are shown, for example, in FIG. 2A. For purposes of this disclosure, the term "geometric similarity" is defined as having same shapes but have different sizes, e.g., two circles having different diameters.

Referring generally to FIG. 1, and particularly to, e.g., FIGS. 2A and 4C-4E, first portion 110 further comprises at least one vent opening 118, sized to enable gaseous substance to flow therethrough. The preceding subject matter of this paragraph characterizes example 23 of the present disclosure, wherein example 23 also includes the subject matter according to any one of examples 1 to 22, above.

At least one vent opening 118, which enables a gaseous substance to flow therethrough, is used to prevent air bubbles from being trapped between template 100 and workpiece 600 when template 100 is placed on workpiece 600. Eliminating air bubbles, in turn, ensures proper alignment and adhesion of template 100 relative to workpiece 600. Also, eliminating air bubbles ensures direct and continuous contact between template 100 and workpiece 600 and prevents material 620 from flowing between template 100 and workpiece 600.

In some examples, at least one vent opening 118 is positioned on first portion 110 and used at this location when first inner peripheral edge 111 is sufficiently airtight with protuberance 610 when protuberance 610 is inserted into positioning opening 115. The gaseous substance, e.g., air between template 100 and workpiece 600, is not able to escape between first inner peripheral edge 111 and protuberance 610 when template 100 is advanced toward base 612 of protuberance 610. At the same time, the gaseous substance is not able to reach second outer peripheral edge 133 of second portion 130, especially if second portion 130 is being adhered to workpiece 600 before first portion 110.

In some examples, at least one vent opening 118 is formed using a mechanical cutter (e.g., a die cutter), a laser cutter, or other types of cutting/material-removal tools. When at least one vent opening 118 is one of multiple vent openings as shown, for example, in FIG. 2A, these multiple vent openings are evenly distributed throughout first portion 110, in some examples.

At least one vent opening 118 is a through opening. For purposes of this disclosure, the teen "through opening" is defined as an opening that extends between two opposite sides of an object and enables fluid flow through the opening.

Referring generally to FIG. 1, and particularly to, e.g., FIGS. 2A and 4E, at least one vent opening 118 is circumferentially closed. The preceding subject matter of this paragraph characterizes example 24 of the present disclosure, wherein example 24 also includes the subject matter according to example 23, above.

In some examples, at least one vent opening 118 is circumferentially closed to ensure integrity of at least one vent opening 118 as well as integrity of first portion 110 and template 100. In some examples, at least one vent opening 118 that is circumferentially closed does not have stress-concentration locations to initiate tearing of first portion 110 at the edge, forming at least one vent opening 118.

In some examples, at least one vent opening 118, which is circumferentially closed, is formed using a mechanical cutter (e.g., a die cutter), a laser cutter, or other types of cutting/material-removal tools. At least one vent opening 118 that is circumferentially closed has various shapes, such as a circular shape, shown in FIG. 2A. When at least one vent opening 118 is one of multiple vent openings, as shown, for example, in FIG. 2A, each of these multiple vent openings is circumferentially closed.

Referring generally to FIG. 1, and particularly to, e.g., FIG. 4C, at least one vent opening 118 is circumferentially open. The preceding subject matter of this paragraph characterizes example 25 of the present disclosure, wherein example 25 also includes the subject matter according to example 23, above.

At least one vent opening 118 that is circumferentially open assists with separating first portion 110 of template 100 from second portion 130. For example, at least one vent opening 118 extends to second inner peripheral edge 131 and/or positioning opening 115 and defines a point where first portion of template 100 starts separating from second portion 130. Furthermore, various components and features of template 100 are positioned within at least one vent opening 118, in some examples.

In some examples, at least one vent opening 118 that is circumferentially open is formed using a mechanical cutter (e.g., a die cutter), a laser cutter, or other types of cutting/material-removal tools. In some examples, at least one vent opening 118 that is circumferentially open extends between second inner peripheral edge 131 and positioning opening 115, as shown, for example, in FIGS. 2E and 4E.

Referring generally to FIG. 1, and particularly to, e.g., FIG. 4C, at least one vent opening 118 is, at least in part, defined by first inner peripheral edge 111 of first portion 110. The preceding subject matter of this paragraph characterizes example 26 of the present disclosure, wherein example 26 also includes the subject matter according to example 23 or 25, above.

When at least one vent opening 118 is, at least in part, defined by first inner peripheral edge 111, at least one vent opening 118 extends to and is open to positioning opening 115. This feature enables a gaseous substance to flow through at least one vent opening 118 near positioning opening 115, thereby preventing air bubbles between template 100 and workpiece 600. Furthermore, at least one vent opening 118 that is, at least in part, defined by first inner peripheral edge 111, is circumferentially open and assists with separating first portion 110 of template 100 from second portion 130.

In some examples, at least one vent opening 118 that is circumferentially open is formed using a mechanical cutter (e.g., a die cutter), a laser cutter, or other types of cutting/material-removal tools. In some examples, at least one vent opening 118 is formed in the same step with forming positioning opening 115. At least one vent opening 118 that is, at least in part, defined by first inner peripheral edge 111, is also, at least in part, defined by initial part 132 of second inner peripheral edge 131 as shown, for example, in FIGS. 4D and 4E.

Referring generally to FIG. 1, and particularly to, e.g., FIGS. 2A, 2B, and 4E, first portion 110 further comprises first-portion tab 119. The preceding subject matter of this paragraph characterizes example 27 of the present disclosure, wherein example 27 also includes the subject matter according to any one of examples 1 to 26, above.

First-portion tab 119 assists with separating first portion 110 from second portion 130. For example, first portion 110 lies on the top of and is conformal to second portion 130 or lies on the top of and is conformal to workpiece 600. First-portion tab 119 simplifies the process of lifting an edge, corner, or another part of first portion 110 from the surface of second portion 130 or workpiece 600 and separating first portion 110 from second portion 130.

In some examples, first-portion tab 119 has various edge features (e.g., sharp corners, small radius, bends, etc.) to assist with separating first-portion tab 119 from workpiece 600. First-portion tab 119 is formed using a mechanical cutter (e.g., a die cutter), a laser cutter, or other types of cutting/material-removal tools. In some examples, first-portion tab 119 is formed in the same step with forming positioning opening 115 and/or forming at least one vent opening 118.

Referring generally to FIG. 1, and particularly to, e.g., FIGS. 2A, 2B, and 4E, first-portion tab 119 projects over second-portion environment-facing surface 136 of second portion 130. The preceding subject matter of this paragraph characterizes example 28 of the present disclosure, wherein example 28 also includes the subject matter according to example 27, above.

When first-portion tab 119 projects over second-portion environment-facing surface 136 of second portion 130, the process of lifting first-portion tab 119 and pulling it away from second-portion environment-facing surface 136 is simpler than, for example, when first-portion tab 119 is positioned at the same level with second portion 130. In this example, the end of first-portion tab 119 is readily accessible and is picked up when the user slides an object over second-portion environment-facing surface 136 toward first-portion tab 119.

At least two examples of template 100, in which first-portion tab 119 projects over second-portion environment-facing surface 136, are available. In the first example, first-portion tab 119 is attached to first portion 110. In this example, first portion 110 and second portion 130 are made from the same sheet. In another example, first portion 110 is attached to second portion 130, rather than being made from the same sheet. However, first-portion tab 119 and first portion 110 is made from the same sheet.

Referring generally to FIG. 1, and particularly to, e.g., FIGS. 4F and 4G, only a portion of first-portion tab 119 projects over second-portion environment-facing surface 136 of second portion 130. The preceding subject matter of this paragraph characterizes example 29 of the present disclosure, wherein example 29 also includes the subject matter according to example 27 or 28, above.

When only a portion of first-portion tab 119 projects over second-portion environment-facing surface 136 of second portion 130, the process of lifting first-portion tab 119 and pulling it away from second-portion environment-facing surface 136 is simpler than, for example, when first-portion tab 119 in its entirety of projects over second-portion environment-facing surface 136. Specifically, the remaining portion of first-portion tab 119, which does not project over second-portion environment-facing surface 136, is easily picked up by the user through at least one vent opening 118. The remaining portion of first-portion tab 119 is positioned above and away from workpiece 600, enabling easy access, in some examples.

When only a portion of first-portion tab 119 projects over second-portion environment-facing surface 136, first-portion tab 119 extends over of second inner peripheral edge 131 as, for example, shown in FIG. 4G. The remaining portion of first-portion tab 119, which does not project over second-portion environment-facing surface 136, is not attached to any components of template 100. In some examples, the area of this remaining portion represents between 25% and 90% of the area of first-portion tab 119, or, more specifically, between 50% and 75% of the area of the first-portion tab.

Referring generally to FIG. 1 and particularly to, e.g., FIG. 4E, first portion 110 further comprises weakened region 117. The preceding subject matter of this paragraph characterizes example 30 of the present disclosure, wherein example 30 also includes the subject matter according to any one of examples 1 to 29, above.

Weakened region 117 helps with separating first portion 110 from second portion 130. Specifically, weakened region 117 enables first portion 110 to be broken into smaller sub-portions and also enables sequential removal of these sub-portions rather than attempting to remove first portion 110 as a whole. Weakened region 117 reduces the amount of force that needs to be applied to first-portion tab 119 during this step.

Weakened region 117 takes any one of various forms (e.g., a perforation or a thinned region), shapes (e.g., straight line, serpentine, etc.), and locations in first portion 110. In some examples, weakened region 117 is formed during fabrication of template 100 together with other such features. Weakened region 117 is formed, for example, using a mechanical cutter, a laser, or other cutting/material-removal tools. Weakened region 117 extends, for example, to first-portion tab 119 as shown, for example, in FIG. 4E. The interface between weakened region 117 and first-portion tab 119 is a point where the separation of first portion 110 from second portion 130 begins, in some examples.

Referring generally to FIG. 1 and particularly to, e.g., FIG. 4E, weakened region 117 is a perforation. The preceding subject matter of this paragraph characterizes example 31 of the present disclosure, wherein example 31 also includes the subject matter according to example 30, above.

The perforation enables first portion 110 to be separated into multiple sub-parts without using additional tools, such as cutters, or applying excessive force such that second portion 130 remains attached to workpiece when first portion 110 is separated. The user simply pulls first portion 110 away from second portion 130.

In some examples, the perforation is formed in first portion 110 using a mechanical cutter (e.g., a die cutter), a laser cutter, or other types of cutting/material-removal tools. The perforation represents, for example, at least about 50% of the total length of a segment along which the perforation extends or, more specifically, at least about 75% of the total length of such segment or, even more specifically, at least about 90% of the total length of such segment. A larger percentage is associated with less resistance during removal of first portion 110, but is also associated with less support during alignment of template 100 on protuberance 610 of workpiece 600.

Referring generally to FIG. 1, and particularly to, FIG. 4E, weakened region 117 is a thinned region. The preceding subject matter of this paragraph characterizes example 32 of the present disclosure, wherein example 32 also includes the subject matter according to example 30, above.

The thinned region enables first portion 110 to be separated into multiple sub-parts without using additional tools, such as cutters, or applying excessive force such that second portion 130 remains attached to workpiece when first portion 110 is separated. The user simply pulls first portion 110 away from second portion 130.

In some examples, the thinned region is formed in first portion 110 using a mechanical cutter (e.g., using a kiss cutting technique), a laser ablation machine, or other types of cutting/material removal tools. The thinned region represents, for example, at least about 50% of the thickness of first portion 110 or, more specifically, at least about 75% of the thickness of the first portion or, even more specifically, at least about 90% of the thickness of the first portion. A larger percentage is associated with less resistance during removal of first portion 110, but is also associated with less support during alignment of template 100 on protuberance 610 of workpiece 600.

Referring generally to FIG. 1, and particularly to, e.g., FIG. 4E, first portion 110 further comprises first-portion tab 119. Weakened region 117 extends from first-portion tab 119 to first inner peripheral edge 111 of first portion 110. The preceding subject matter of this paragraph characterizes example 33 of the present disclosure, wherein example 33 also includes the subject matter according to any one of examples 30 to 32, above.

When weakened region 117 extends from first-portion tab 119 to first inner peripheral edge 111, first portion 110 is separated in at least two parts along this weakened region 117 during the step of separating first portion 110 from second portion 130. Removal of these parts in sequence is simpler than removal of first portion 110 as a whole. Furthermore, the interface between weakened region 117 and first-portion tab 119 defines, in some examples, a point where the separation of first portion 110 from second portion 130 begins. Therefore, the step of separating first portion 110 from second portion 130 is performed in a controlled manner.

Referring to FIG. 4A, when the user pulls first-portion tab 119, first portion 110 starts separating from second portion 130 near first-portion tab 119. At the same time, first portion 110 separates into two parts along weakened region 117 and only the part, attached to first-portion tab 119, is initially pulled away from second portion 130 and from workpiece 600. The separation of first portion 110 from second portion 130 occurs along the perimeter of interface 120 in the counterclockwise direction, based on the example and orientation, shown in FIG. 4A. Without weakened region 117, the separation of first portion 110 from second portion 130 would have to happen along two parts of interface 120 (both in clockwise and counterclockwise directions) and would require much higher pulling force.

Referring generally to FIG. 1, and particularly to, e.g., FIGS. 2A, 2B, and 4A-4C, second portion 130 further comprises second-portion tab 139. The preceding subject matter of this paragraph characterizes example 34 of the present disclosure, wherein example 34 also includes the subject matter according to any one of examples 1 to 33, above.

Second-portion tab 139 is used to enable removal of second portion 130 from workpiece 600 after material has been applied over workpiece 600 and, in some examples, over second inner peripheral edge 131. Second portion 130 is removably attached to workpiece 600 using, for example, adhesive layer 160, located on at least a portion of second-portion workpiece-facing surface 134. However, second-portion tab 139 is adhesive free. Furthermore, the edge of second-portion tab 139 is easily accessible by the user in comparison to other parts of second-portion tab 139.

In some examples, second-portion tab 139 is picked up and pulled away from workpiece 600 by the user, when second portion 130 is removed from workpiece 600. Second-portion tab 139 forms or is attached to second outer peripheral edge 133 of second portion 130 and is used to initiate peeling of second portion 130 from workpiece 600 at second outer peripheral edge 133. Specifically, in some examples, second-portion tab 139 is monolithic with the rest of second portion 130, e.g., formed from the same sheet and has the same thickness and composition. Alternatively, second-portion tab 139 is attached to the rest of second portion 130 using, for example, adhesive, welding, or other techniques.

Referring generally to FIG. 1, and particularly to, e.g., FIGS. 2A, 2B, and 4A-4C, second-portion tab 139 is monolithic with second portion 130. The preceding subject matter of this paragraph characterizes example 35 of the present disclosure, wherein example 35 also includes the subject matter according to example 34, above.

Second-portion tab 139 being bounded by second outer peripheral edge 133 of second portion 130 indicates that second-portion tab 139 is, for example, a part of second portion 130 (e.g., monolithic with the rest of second portion 130) and formed together with the rest of second portion 130. This unity simplifies manufacturing of template 100, such that second-portion tab 139 is formed together with the rest of second portion 130, e.g., from the same sheet of plastic or some other material. Furthermore, this unity provides stronger support to second-portion tab 139 relative to the rest of second portion 130, which is needed when second-portion tab 139 is used to peel second portion 130 from workpiece 600.

Referring generally to FIG. 1, and particularly to, e.g., FIG. 2B, second-portion tab 139 is adhesive-free. The preceding subject matter of this paragraph characterizes example 36 of the present disclosure, wherein example 36 also includes the subject matter according to example 34 or 35, above.

When second-portion tab 139 is adhesive-free, second-portion tab 139 does not adhere to workpiece 600, like other parts of second portion 130. As such, second-portion tab 139 is easily separated from workpiece 600 when removal of second portion 130 from workpiece 600 is initiated. The rest of second portion 130 is adhered to workpiece 600 to ensure alignment of second portion 130 relative to workpiece 600 during various processing steps. The initial separation of second-portion tab 139 from workpiece 600 helps to initiate peeling of the rest of second portion 130 from workpiece 600.

In some examples, adhesive layer 160 is selectively applied to second-portion workpiece-facing surface 134 of second portion 130 such that second-portion tab 139 remains adhesive-free. Alternatively, a part of adhesive layer 160 is removed from a part of second-portion workpiece-facing surface 134, corresponding to second-portion tab 139. In either case, second-portion tab 139 is adhesive-free and is not adhered to workpiece 600 when at least a portion of second-portion workpiece-facing surface 134 of second portion 130 of template 100 is removably attached to workpiece 600. In this example, second-portion tab 139 is not a part of this portion of second-portion workpiece-facing surface 134.

Referring generally to FIG. 1, and particularly to, e.g., FIGS. 4A and 4B, second portion 130 further comprises weakened region 135, extending between second inner peripheral edge 131 of second portion 130 and second outer peripheral edge 133 of second portion 130 such that pulling second-portion tab 139 causes second portion 130 to separate along weakened region 135. The preceding subject matter of this paragraph characterizes example 37 of the present disclosure, wherein example 37 also includes the subject matter according to any one of examples 34 to 36, above.

Weakened region 135 helps with removal of second portion 130 from workpiece 600. Specifically, weakened region 135 enables new edges to be formed on second portion 130 when second portion 130 is split along weakened region 135. These new edges are used for removal of second portion 130 from workpiece 600 using lower force and along a different path. For example, second portion 130 is peeled along a shorter edge in comparison to a step when second portion 130 is its complete form without forming new edges corresponding to weakened region 135.

Weakened region 135 takes any one of various forms (e.g., a perforation or a thinned region), shapes (e.g., straight line, serpentine, etc.), and locations in second portion 130. Weakened region 135 is formed, for example, during fabrication of template 100 together with other such features. In some examples, weakened region 135 is formed using a mechanical cutter, a laser, or other cutting/material-removing tools.

Referring to FIG. 2J, when the user pulls second-portion tab 139, second portion 130 is split along weakened region 135 and the top part of second portion 130 is first peeled from workpiece 600. This approach enables second portion 130 to be gradually removed from workpiece 600 and also enables use of a lower force for removal or overcoming resistance from material 620, which extends over second portion 130 and resists removal of second portion 130 from workpiece 600 (e.g., when material 620 is particularly tacky or after material 620 is cured).

Referring generally to FIG. 1, and particularly to, e.g., FIGS. 4A and 4B, weakened region 135 of second portion 130 intersects visual material-placement indicator 170 of second portion 130. The preceding subject matter of this paragraph characterizes example 38 of the present disclosure, wherein example 38 also includes the subject matter according to example 37, above.

Weakened region 135 enables new edges to be formed on second portion 130 when second portion 130 is split along weakened region 135. These edges extend to second outer peripheral edge 133 and to second inner peripheral edge 131, to ensure that peeling is performed along a short segment, which enables the peeling force to be reduced. Since visual material-placement indicator 170 is positioned between second outer peripheral edge 133 and second inner peripheral edge 131, weakened region 135 intersects visual material-placement indicator 170. At the same time, material 620 extends over second portion 130 up to visual material-placement indicator 170. When second portion 130 is split along weakened region 135 during removal of second portion 130, this step also causes a split in a part of material 620, extending over second portion 130, which assists with removal of second portion 130 and the above-mentioned part of material 620.

Weakened region 135 takes any one of various forms (e.g., a perforation or a thinned region), shapes (e.g., straight line, serpentine, etc.), and locations in second portion 130. In some examples, weakened region 135 is formed during fabrication of template 100 together with other such features. Weakened region 135 is formed using a mechanical cutter, a laser, and other cutting/material-removal tools.

Referring generally to FIG. 1, and particularly to, e.g., FIG. 4A, weakened region 135 of second portion 130 is a perforation. The preceding subject matter of this paragraph characterizes example 39 of the present disclosure, wherein example 39 also includes the subject matter according to example 37 or 38, above.

The perforation enables removal of second portion 130 from workpiece 600 without applying excessive force by splitting second portion 130 into multiple sub-parts and without using additional tools, such as cutters. The user simply pulls second portion 130 away from workpiece 600.

In some examples, the perforation is formed in second portion 130 using a mechanical cutter (e.g., a die cutter), a laser cutter, or other types of cutting/material-removal tools. The perforation represents, for example, at least about 50% of the total length of a segment, along which the perforation extends or, more specifically, at least about 75% of the total length of such segment or, even more specifically, at least about 90% of the total length of such segment. A larger percentage is associated with less resistance during removal of second portion 130, but is also associated with less support when second portion 130 is attached to workpiece 600.

Referring generally to FIG. 1, and particularly to, e.g., FIG. 4B, weakened region 135 of second portion 130 is a thinned region. The preceding subject matter of this paragraph characterizes example 40 of the present disclosure, wherein example 40 also includes the subject matter according to example 37, above.

The thinned region enables removal of second portion 130 from workpiece 600 without applying excessive force by splitting second portion 130 into multiple sub-parts and without using additional tools, such as cutters. The user simply pulls second portion 130 away from workpiece 600.

In some examples, the thinned region is formed in second portion 130 using a mechanical cutter (e.g., using a kiss cutting technique), a laser-ablation machine, or other types of cutting/material-removal tools. The thinned region represents, for example, at least about 50% of the thickness of second portion 130 or, more specifically, at least about 75% of the thickness of second portion 130 or, even more specifically, at least about 90% of the thickness of second portion 130. A larger percentage is associated with less resistance during removal of second portion 130, but is also associated with less support when second portion 130 is attached to workpiece 600.

Referring generally to FIG. 1, and particularly to, e.g., FIGS. 2A and 2B, second portion 130 further comprises additional second-portion tab 137, opposite second-portion tab 139. The preceding subject matter of this paragraph characterizes example 41 of the present disclosure, wherein example 41 also includes the subject matter according to any one of examples 34 to 40, above.

In some examples, when second portion 130 is removed from workpiece 600, protuberance 610 interferes with second portion 130 especially when the radial distance between protuberance 610 and second inner peripheral edge 131 is small and/or when second portion 130 is removed (e.g., peeled) at a large angle relative to workpiece 600. Additional second-portion tab 137, together with second-portion tab 139, helps to remove second portion 130 while second portion 130 is substantially parallel or close to parallel to workpiece 600 or at least to reduce the angle at which second portion 130 is positioned relative to workpiece 600 during the removal step.

In some examples, additional second-portion tab 137 and second-portion tab 139 are positioned on opposite ends of template 100 as schematically shown, for example, in FIGS. 2A and 2B. Both additional second-portion tab 137 and second-portion tab 139 are, for example, adhesive free. Both additional second-portion tab 137 and second-portion tab 139 are, for example, picked up and pulled away from workpiece 600 during removal of second portion 130 from workpiece 600. Both additional second-portion tab 137 and second-portion tab 139 form or are attached to second outer peripheral edge 133 of second portion 130 and initiate peeling on second portion 130 at second outer peripheral edge 133. In some examples, one or both of additional second-portion tab 137 and second-portion tab 139 are adhered to workpiece 600.

Referring generally to FIG. 1, and particularly to, e.g., FIGS. 2A and 2B, additional second-portion tab 137 is monolithic with second portion 130. The preceding subject matter of this paragraph characterizes example 42 of the present disclosure, wherein example 42 also includes the subject matter according to example 41, above.

Additional second-portion tab 137 being bounded by second outer peripheral edge 133 of second portion 130 indicates that additional second-portion tab 137 is a part of second portion 130 (e.g., monolithic with the rest of second portion 130) and formed together with the rest of second portion 130. This unity simplifies manufacturing of template 100, such that additional second-portion tab 137 is formed together with the rest of second portion 130, e.g., from the same sheet of plastic or some other material. Furthermore, this unity provides stronger support to additional second-portion tab 137 relative to the rest of second portion 130, which is needed when additional second-portion tab 137 is used to peel second portion 130 from workpiece 600.

Referring generally to FIG. 1, and particularly to, e.g., FIGS. 2A and 2B, additional second-portion tab 137 is adhesive-free. The preceding subject matter of this paragraph characterizes example 43 of the present disclosure, wherein example 43 also includes the subject matter according to example 41 or 42, above.

When additional second-portion tab 137 is adhesive-free, additional second-portion tab 137 does not adhere to workpiece 600, like other parts of second portion 130. As such, additional second-portion tab 137 is easily separated from workpiece 600 when removal of second portion 130 from workpiece 600 is initiated. The rest of second portion 130 is adhered to workpiece 600 to ensure alignment of second portion 130 relative to workpiece 600 during various processing steps. The initial separation of additional second-portion tab 137 from workpiece 600 helps to initiate peeling of the rest of second portion 130 from workpiece 600.

In some examples, adhesive layer 160 is selectively applied to second-portion workpiece-facing surface 134 of second portion 130 such that additional second-portion tab 137 remains adhesive-free. Alternatively, a part of adhesive layer 160 is removed from a part of second-portion workpiece-facing surface 134, corresponding to additional second-portion tab 137. In either case, additional second-portion tab 137 is adhesive-free and is not adhered to workpiece 600 when at least a portion of second-portion workpiece-facing surface 134 of second portion 130 of template 100 is removably attached to workpiece 600. In this example, additional second-portion tab 137 is not a part of this portion of second-portion workpiece-facing surface 134.

Referring generally to FIG. 1, and particularly to, e.g., FIGS. 2A, 2E, 3A-3D, and 4A-4C, visual material-placement indicator 170 of second portion 130 and second inner peripheral edge 131 of second portion 130 are concentric. The preceding subject matter of this paragraph characterizes example 44 of the present disclosure, wherein example 44 also includes the subject matter according to any one of examples 1 to 43, above.

Visual material-placement indicator 170 and second inner peripheral edge 131 being concentric is one of the factors, indicating that the gap (or the shortest radial distance) between visual material-placement indicator 170 and second inner peripheral edge 131 will be the same around the entire perimeter of second inner peripheral edge 131. As such, the runout distance of material 620, allowed past second inner peripheral edge 131 and up to visual material-placement indicator 170, will be similar for all locations around the perimeter of visual material-placement indicator 170. As a result, the height of outer edge 621 of material 620, after removal of second portion 130 from workpiece 600, will vary minimally around the entire perimeter of outer edge 621.

The gap (or the shortest radial distance) between visual material-placement indicator 170 and second inner peripheral edge 131 depends on characteristics of material 620 (e.g., viscosity), characteristics of second-portion environment-facing surface 136 of second portion 130 (e.g., surface tension), a desired height of outer edge 621 of material 620, and other factors. In some examples, this gap (or the shortest radial distance) is between about 0.5 millimeters and about 5 millimeters or, more specifically, between about 1 millimeter and about 3 millimeters. The gap (or the shortest radial distance) is, for example, substantially constant around the entire perimeter of visual material-placement indicator 170 (e.g., within 25% deviation or even within 10% deviation relative to the material-placement indicator).

Referring generally to FIG. 1, and particularly to, e.g., FIGS. 2A, 2E, 3A-3D, and 4A-4C, visual material-placement indicator 170 of second portion 130 and second inner peripheral edge 131 of second portion 130 are geometrically similar. The preceding subject matter of this paragraph characterizes example 45 of the present disclosure, wherein example 45 also includes the subject matter according to any one of examples 1 to 44, above.

Visual material-placement indicator 170 and second inner peripheral edge 131 being geometrically similar is one of the factors, indicating that the gap (or the shortest radial distance) between visual material-placement indicator 170 and second inner peripheral edge 131 will be the same around the entire perimeter of second inner peripheral edge 131. As such, the runout distance of material 620, allowed past second inner peripheral edge 131 and up to visual material-placement indicator 170, will be similar for all locations around the perimeter of visual material-placement indicator 170. As a result, the height of outer edge 621 of material 620, after removal of second portion 130 from workpiece 600, will vary minimally around the entire perimeter of outer edge 621.

In some examples, visual material-placement indicator 170 and second inner peripheral edge 131 are both circular as shown, for example, in FIG. 2A. However, other shapes (oval, triangular, hexagonal, etc.) are also within the scope of this disclosure. In some examples, visual material-placement indicator 170 and second inner peripheral edge 131, as well as positioning opening 115, all have the same shape.

Referring generally to FIG. 1, and particularly to, e.g., FIGS. 2A, 2E, 3A-3D, and 4A-4C, visual material-placement indicator 170 is a marking on second-portion environment-facing surface 136. The preceding subject matter of this paragraph characterizes example 46 of the present disclosure, wherein example 46 also includes the subject matter according to any one of examples 1 to 45, above.

Marking 172 provides high contrast levels on second-portion environment-facing surface 136 and is easily identifiable by the user. Specifically, marking 172 is visible on second-portion environment-facing surface 136 in poorly lit environments. Visibility of visual material-placement indicator 170 ensures proper application of material 620 by the user when material 620 extends over second-portion environment-facing surface 136 and toward visual material-placement indicator 170.

In some examples, marking 172 is added to second-portion environment-facing surface 136 using an inline printer or a laser engraver during fabrication of template 100. The position of marking 172 is referenced relative to other components of template 100, such as tabs, vent openings, and the like. The color of marking 172 is, for example, selected to contrast with second-portion environment-facing surface 136. For example, marking 172 is black or dark colored when second-portion environment-facing surface 136 is white or light colored.

Referring generally to FIG. 1, and particularly to, e.g., FIGS. 2A and 2F, visual material-placement indicator 170 projects outwardly relative to second-portion environment-facing surface 136. The preceding subject matter of this paragraph characterizes example 47 of the present disclosure, wherein example 47 also includes the subject matter according to any one of examples 1 to 46, above.

Visual material-placement indicator 170 projecting outwardly relative to second-portion environment-facing surface 136 is used to control the flow of material 620 on second-portion environment-facing surface 136, in addition to the controlled application of material 620 by the user. Specifically, visual material-placement indicator 170 projecting outwardly acts as a barrier for stopping material 620 from flowing beyond visual material-placement indicator 170. Material 620 is allowed to flow up to visual material-placement indicator 170, but not past visual material-placement indicator 170.

In some examples, visual material-placement indicator 170 projecting outwardly is formed by adding material to second-portion environment-facing surface 136. For example, additive manufacturing techniques are used to form visual material-placement indicator 170. Alternatively, some material is redistributed on second-portion environment-facing surface 136 to form visual material-placement indicator 170 that projects outwardly. The height of visual material-placement indicator 170, projecting outwardly (e.g., between the tip of visual material-placement indicator 170 and second-portion environment-facing surface 136), depends on characteristics of material 620 (e.g., viscosity), characteristics of second-portion environment-facing surface 136 of second portion 130 (e.g., surface tension), a desired height of outer edge 621 of material 620, and other factors. In some examples, the height is between about 0.2 millimeters and about 1 millimeter or, more specifically, between about 0.3 millimeters and about 0.8 millimeters.

Referring generally to FIG. 1, and particularly to, e.g., FIGS. 2A and 2G, visual material-placement indicator 170 is inwardly recessed relative to second-portion environment-facing surface 136. The preceding subject matter of this paragraph characterizes example 48 of the present disclosure, wherein example 48 also includes the subject matter according to any one of examples 1 to 46, above.

Visual material-placement indicator 170 that is recessed relative to second-portion environment-facing surface 136, is used to control the flow of material 620 on second-portion environment-facing surface 136. Specifically, visual material-placement indicator 170 that is recessed acts as a barrier for material 620 that stops material 620 from flowing beyond visual material-placement indicator 170. Visual material-placement indicator 170 changes the profile of second-portion environment-facing surface 136 and flow properties of material 620 on second-portion environment-facing surface 136. Material 620 is allowed to flow up to visual material-placement indicator 170, but not past visual material-placement indicator 170.

In some examples, visual material-placement indicator 170 that is recessed is formed by removing material from second-portion environment-facing surface 136. For example, laser ablation is used to form visual material-placement indicator 170 of this type. Alternatively, some material is redistributed on second-portion environment-facing surface 136 to form visual material-placement indicator 170 that projects outwardly relative to second-portion environment-facing surface 136. The depth of visual material-placement indicator 170 that is recessed depends on characteristics of material 620 (e.g., viscosity), characteristics of second-portion environment-facing surface 136 of second portion 130 (e.g., surface tension), and other factors. In some examples, the depth is between about 0.2 millimeters and about 1 millimeter or, more specifically, between about 0.3 millimeters and about 0.8 millimeters.

Referring generally to FIG. 1, and particularly to, e.g., FIGS. 2A, 2F, and 2G, visual material-placement indicator 170 is configured to control flow of material 620 on second-portion environment-facing surface 136. The preceding subject matter of this paragraph characterizes example 49 of the present disclosure, wherein example 49 also includes the subject matter according to any one of examples 1 to 48, above.

While visual material-placement indicator 170 is operable as a visual guide for the user, placing material 620 onto workpiece 600, additional functionality is provided by the ability of visual material-placement indicator 170 to control flow of material 620 on second-portion environment-facing surface 136. In particular, visual material-placement indicator 170 prevents flow of material 620 across visual material-placement indicator 170. For example, when material 620 has a low viscosity and/or is deposited as a thick layer, material 620 tends to flow on second-portion environment-facing surface 136 after its deposition. When visual material-placement indicator 170 is able to control the flow of material 620 on second-portion environment-facing surface 136, the user does not need to worry about this post-deposition flow and account for various characteristics of material 620.

Visual material-placement indicator 170 controls the flow of material 620 on second-portion environment-facing surface 136 when visual material-placement indicator 170 protrudes above second-portion environment-facing surface 136, recesses below second-portion environment-facing surface 136, or otherwise modifies one or more surface properties of second-portion environment-facing surface 136. For example, the surface properties of second-portion environment-facing surface 136 are changed at a specific location by adding visual material-placement indicator 170 to this location. Visual material-placement indicator 170 is formed, for example, by adding material, removing material, or changing a part of second-portion environment-facing surface 136.

Referring generally to FIG. 1, and particularly to, e.g., FIG. 2B, template 100 further comprises liner 220, releasably covering adhesive layer 160, such that adhesive layer 160 is between at least a portion of liner 220 and at least a portion of second portion 130. The preceding subject matter of this paragraph characterizes example 50 of the present disclosure, wherein example 50 also includes the subject matter according to any one of examples 1 to 49, above.

Liner 220 protects adhesive layer 160 and enables stacking multiple templates prior to their use. In some examples, liner 220 is a part of template 100 up until advancing template 100 toward workpiece 600. Specifically, when template 100 is applied to workpiece 600, liner 220 is removed and adhesive layer 160 comes in direct contact with workpiece 600, thereby securing template 100 on workpiece 600.

Liner 220 is formed, for example, from polyimide (PI), polyethylene naphthalate (PEN), polyethylene terephthalate (PET), polymethyl methacrylate (PMMA), ethyl vinyl acetate (EVA), polyethylene (PE), polypropylene (PP), polyvinyl fluoride (PVF), polyamide (PA), soldermask, and/or polyvinyl butyral (PVB). Liner 220 is attached, for example, to adhesive layer 160 soon after adding adhesive layer 160 to second portion 130 of template 100.

Referring generally to FIG. 5 and particularly to, e.g., FIGS. 6A-6J, method 500 of applying material 620 to workpiece 600 around protuberance 610, extending from workpiece 600, is disclosed. Method 500 comprises (block 510) advancing template 100 toward workpiece 600 to insert protuberance 610 into positioning opening 115, located in first portion 110 of template 100. First-portion workpiece-facing surface 114 of first portion 110 partially overlaps with and is removably attached to second-portion environment-facing surface 136 of second portion 130, forming interface 120 between first-portion workpiece-facing surface 114 and second-portion environment-facing surface 136. Template 100 is advanced toward workpiece 600 until template 100 is at least partially located relative to workpiece 600 via first inner peripheral edge 111 of first portion 110 and adhesive layer 160, located on at least portion of second-portion workpiece-facing surface 134 of second portion 130, is in contact with workpiece 600. First inner peripheral edge 111 of first portion 110 is geometrically complementary to base 612 of protuberance 610 and defines positioning opening 115. Second-portion workpiece-facing surface 134 is opposite second-portion environment-facing surface 136. Method 500 further comprises (block 520) removably attaching at least portion of second-portion workpiece-facing surface 134 to workpiece 600. Method 500 additional comprises (block 530) separating first portion 110 of template 100 from second portion 130 along interface 120 while at least the portion of second-portion workpiece-facing surface 134 remains attached to workpiece 600. Method 500 also comprises (block 540) applying material 620 to workpiece 600 around protuberance 610 such that material 620 overlaps second inner peripheral edge 131 of second portion 130 of template 100, but does not overlap visual material-placement indicator 170, located on second-portion environment-facing surface 136. Visual material-placement indicator 170 surrounds and is spaced away from second inner peripheral edge 131. Method 500 further comprises (block 550) detaching second portion 130 of template 100 from workpiece 600. The preceding subject matter of this paragraph characterizes example 51 of the present disclosure.

Protuberance 610 is inserted into positioning opening 115 to align template 100 relative to workpiece 600. When first-portion workpiece-facing surface 114 of first portion 110 is in contact with workpiece 600, at least the radial alignment is achieved. In some examples, e.g., if neither protuberance 610 nor positioning opening 115 is circular, the angular alignment of template 100 relative to workpiece 600 is achieved as well. Removably attaching at least a portion of second-portion workpiece-facing surface 134 of second portion 130 of template 100 to workpiece 600 secures the alignment position of template 100 relative to workpiece 600. First portion 110 of template 100 is only needed for the alignment and is removed to expose a portion of workpiece 600, which is to receive material 620. When material 620 is applied to workpiece 600 around protuberance 610, second portion 130 of template 100 protects other portions of workpiece 600 from being contaminated with material 620.

Referring to FIGS. 6A and 6B, workpiece 600 comprises protuberance 610 extending from workpiece 600. Environment-facing surface 607 of workpiece 600 interfaces with protuberance 610 forming base 612 of protuberance 610. Environment-facing surface 607 is substantially planar (as shown, for example, in FIG. 6B). Alternatively, environment-facing surface 607 is non-planar. In the latter example, template 100 is substantially flexible to conform to environment-facing surface 607. A part of environment-facing surface 607 adjacent to protuberance 610 receives material 620 as further described below. Another part of environment-facing surface 607 is protected by second portion 130, which prevents contamination of this other part with material 620.

Referring to block 510 in FIG. 5, template 100 is advanced toward workpiece 600 to insert protuberance 610 into positioning opening 115. Positioning opening 115 is used to align template 100 relative to workpiece 600. The radial alignment occurs as soon as protuberance 610 is inserted into positioning opening 115, e.g., when protuberance 610 is cylindrical. Alternatively, if protuberance 610 is tapered and has base 612 wider than its tip, then the radial alignment does not happen until first-portion workpiece-facing surface 114 of first portion 110 is in contact with workpiece 600. In either case, base 612 of protuberance 610 operates as the final alignment part of protuberance 610. As such, template 100 is advanced until first-portion workpiece-facing surface 114 of first portion 110 is in contact with workpiece 600 so that template 100 is at least partially located relative to workpiece 600 via first inner peripheral edge 111. For purposes of this disclosure, the term "at least partially located relative to" is defined as aligning one component relative to another along one or more linear axes and/or one or more rotation direction. For example, when first inner peripheral edge 111 is in contact with base 612, template 100 is radially aligned relative to workpiece 600. However, depending on the shape of first inner peripheral edge 111 that is in contact with base 612, e.g., if both are round, template 100 is still rotatable relative to workpiece 600 and therefore is not angularly aligned. First inner peripheral edge 111 is geometrically complementary to base 612 of protuberance 610 and defines positioning opening 115. FIGS. 6C and 6D illustrate template 100 and workpiece 600 at this stage.

Referring to block 520 in FIG. 5, removably attaching at least a portion of second-portion workpiece-facing surface 134 of second portion 130 of template 100 to workpiece 600 preserves the alignment of template 100 relative to workpiece 600. In some examples, second-portion workpiece-facing surface 134 is removably attached to workpiece 600 as soon as first-portion workpiece-facing surface 114 of first portion 110 is in contact with workpiece 600. In other words, operations corresponding to blocks 510 and 520 overlap. FIGS. 6C and 6D also illustrate template 100 and workpiece 600 at this stage.

Referring to block 530 in FIG. 5, first portion 110 is no longer needed for alignment of template 100 relative to workpiece 600 since the alignment is preserved by removably attaching second portion 130 to workpiece 600, and first portion 110 is separated from second portion 130. At least a portion of second-portion workpiece-facing surface 134 remains attached to workpiece 600.

Referring to block 540 in FIG. 5, applying material 620 to workpiece 600 around protuberance 610 is performed. FIGS. 6G and 6H also illustrate template 100 and workpiece 600 at this stage. As shown in FIG. 6G, material 620 overlaps second inner peripheral edge 131 up to visual material-placement indicator 170. This overlap ensures that the entire part of workpiece, exposed through template 100, is covered with material 620.

Referring to block 550 in FIG. 5, second portion 130 of template 100 is then detached from workpiece 600. For example, second portion 130 is peeled from workpiece 600 by pulling second-portion tab 139 of second portion 130. In some examples, second portion 130 is at least partially separated along weakened region 135 during this step.

Referring generally to FIG. 5, and particularly to, e.g., FIG. 2B, according to method 500, (block 520) removably attaching at least portion of second-portion workpiece-facing surface 134 of second portion 130 of template 100 to workpiece 600 comprises (block 522) pressing adhesive layer 160, located on at least a portion of second-portion workpiece-facing surface 134, against workpiece 600. The preceding subject matter of this paragraph characterizes example 52 of the present disclosure, wherein example 52 also includes the subject matter according to example 51, above.

Adhesive layer 160 is positioned, for example, on at least a portion of second-portion workpiece-facing surface 134 for removable attachment of second-portion workpiece-facing surface 134 to workpiece 600. The removable attachment occurs when adhesive layer 160 comes in contact with workpiece 600.

In some examples, adhesive layer 160 comprises a pressure-sensitive adhesive (PSA) or, more specifically, a low-tack PSA. When second portion 130 is later detached from workpiece 600, adhesive layer 160 is also removed from workpiece 600 without leaving residue. Adhesive layer 160 is located, for example, only on second-portion workpiece-facing surface 134, while first-portion workpiece-facing surface 114 is free from adhesive.

Referring generally to FIG. 5, and particularly to, e.g., FIGS. 6G-6J, method 500 further comprises (block 545) curing material 620 prior to (block 550) detaching second portion 130 of template 100 from workpiece 600. The preceding subject matter of this paragraph characterizes example 53 of the present disclosure, wherein example 53 also includes the subject matter according to example 51 or 52, above.

Curing material 620 prior to detaching second portion 130 from workpiece 600 ensures that material 620 does not go beyond its intended area identified by second inner peripheral edge 131. Prior to detaching second portion 130 from workpiece 600, second portion 130 protects other areas of workpiece 600 from material 620. However, once second portion 130 is detached, material 620 continues to flow unless material 620 is cured (and solidified as a result of this curing) prior to detaching second portion 130. Once cured, material 620 loses its ability to flow on the surface of workpiece 600.

Curing material 620 prior to detaching second portion 130 is useful for material 620 that is able to flow easily unless it is cured, e.g., material 620 with a low viscosity Curing changes these flow characteristics and sets material 620 at its desired location. Once cured, material 620 is solid, in some examples, and maintains its position.

Referring generally to FIG. 5 and particularly to, e.g., FIGS. 6G-6J, and particularly to, e.g., FIG. 6I, method 500 further comprises (block 550) detaching second portion 130 of template 100 from workpiece 600 before (block 545) curing material 620. The preceding subject matter of this paragraph characterizes example 54 of the present disclosure, wherein example 54 also includes the subject matter according to example 51 or 52, above.

Second portion 130 is detached from workpiece 600 before curing material 620 if, after curing, material 620 provides significant resistance to detaching second portion 130 from workpiece 600. During application of material 620, material 620 overlaps second inner peripheral edge 131. If curing converts material 620 into a hard solid with strong mechanical properties (e.g., tensile strength), then breaking through a portion of material 620, extending over second inner peripheral edge 131, by simply detaching second portion 130 from workpiece 600, is difficult. On the other hand, prior to curing, material 620 is, for example, in a form of a paste that is easily separable with second inner peripheral edge 131 as second portion 130 is detached from workpiece 600.

Referring generally to FIG. 5, and particularly to, e.g., FIG. 2C, according to method 500, (block 530) separating first portion 110 of template 100 from second portion 130 comprises separating interface 120 by pealing apart weld 121 joining first portion 110 and second portion 130 and located between first outer peripheral edge 113 of first portion 110 and second inner peripheral edge 131 of second portion 130. First outer peripheral edge 113 is opposite first inner peripheral edge 111 of first portion 110. The preceding subject matter of this paragraph characterizes example 55 of the present disclosure, wherein example 55 also includes the subject matter according to any one of examples 51 to 54, above.

Weld 121 joins first portion 110 and second portion 130 and, more specifically, supports second portion 130 relative to first portion 110. This support between first portion 110 and second portion 130 is relied on when template 100 is aligned relative to workpiece 600 by inserting protuberance 610 into positioning opening 115. This support ensures that second portion 130 is also aligned relative to workpiece 600, which enables removing first portion 110 by pealing apart weld 121.

In some examples, weld 121 is peeled by pulling first portion 110 away from second portion 130. The peeling force is less than the force needed to separate second portion 130 from workpiece 600. As such, second portion 130 remains attached to workpiece 600 when weld 121 is peeled.

Referring generally to FIG. 5, and particularly to, e.g., FIG. 2D, according to method 500, (block 530) separating first portion 110 of template 100 from second portion 130, comprises separating interface 120 by pealing apart interface adhesive layer 123, joining first portion 110 and second portion 130 and located between first outer peripheral edge 113 of first portion 110 and second inner peripheral edge 131 of second portion 130. First outer peripheral edge 113 is opposite first inner peripheral edge 111 of first portion 110. The preceding subject matter of this paragraph characterizes example 56 of the present disclosure, wherein example 56 also includes the subject matter according to any one of examples 51 to 54, above.

Interface adhesive layer 123 joins first portion 110 and second portion 130 and, more specifically, supports second portion 130 relative to first portion 110. This support between first portion 110 and second portion 130 is needed when template 100 is aligned relative to workpiece 600 by inserting protuberance 610 into positioning opening 115. This support ensures that second portion 130 is also aligned relative to workpiece 600, which enables removing first portion 110 by pealing apart interface adhesive layer 123.

In some examples, interface adhesive layer 123 is peeled apart by pulling first portion 110 away from second portion 130. The peeling force is less than the force needed to separate second portion 130 from workpiece 600. As such, second portion 130 remains attached to workpiece 600 when weld 121 is peeled interface adhesive layer 123.

Referring generally to FIG. 5, and particularly to, e.g., FIGS. 2A, 2E, 3A-3D, and 4A-4C, according to method 500, first inner peripheral edge 111 of first portion 110 is circumferentially closed. The preceding subject matter of this paragraph characterizes example 57 of the present disclosure, wherein example 57 also includes the subject matter according to any one of examples 51 to 56, above.

When first inner peripheral edge 111 is circumferentially closed, first inner peripheral edge 111 is used, for example, in its entirety for alignment of template 100 on protuberance 610 or, more specifically, on base 612 of protuberance 610. This feature ensures more precise alignment of template 100 relative to workpiece 600. Furthermore, softer and/or thinner materials are used for construction of template 100 or, more specifically, of first portion 110 of template when first inner peripheral edge 111 is circumferentially closed. Positioning opening 115 fully defined by a circumferentially closed edge is more likely to maintain its shape than, for example, positioning opening 115 that is only partially defined by a circumferentially open edge.

First inner peripheral edge 111 that is circumferentially closed is formed, for example, using a mechanical cutter (e.g., a die cutter), a laser cutter, or other types of cutting/material-removal tools. For example, a part, corresponding to positioning opening 115, is punched out or otherwise removed from sheet 210 to form first inner peripheral edge 111. First inner peripheral edge 111 that is circumferentially closed is circular FIG. 2A) in some examples or, alternatively, non-circular (e.g., FIG. 2H).

Referring generally to FIG. 5, and particularly to, e.g., FIGS. 2A and 6C, method 500 further comprises, prior to (block 520) removably attaching at least portion of second-portion workpiece-facing surface 134 of second portion 130 of template 100 to workpiece 600, (block 515) aligning template 100 relative to workpiece 600 using visual template-alignment indicator 180. Visual template-alignment indicator 180 is located on at least one of first-portion environment-facing surface 116 of first portion 110 of template 100 or second-portion environment-facing surface 136 of second portion 130 of template 100. The preceding subject matter of this paragraph characterizes example 58 of the present disclosure, wherein example 58 also includes the subject matter according to any one of examples 51 to 57, above.

In some examples, visual template-alignment indicator 180 is used for angular alignment of template 100 relative to workpiece 600 before removably attaching at least a portion of second-portion workpiece-facing surface 134 of second portion 130 of template 100 to workpiece 600. While a combination of first inner peripheral edge 111 and base 612 of protuberance 610 provides radial alignment, in some examples, template 100 is still rotatable relative to workpiece 600.

The user relies on visual template-alignment indicator 180 for angular alignment and aligns visual template-alignment indicator 180 with one or more alignment features 615 on workpiece 600. Alignment features 615 are, for example, markings (line(s), stripe(s), one or more dots), protrusions, indents, and the like, on workpiece 600. Alignment features 615 of workpiece 600 are positioned, for example, on protuberance 610 (e.g., at base 612 and near first inner peripheral edge 111), outside of the footprint of template 100 and near second outer peripheral edge 133 (as shown, for example, in FIG. 6C), or within the footprint of template 100 (in which case, template 100 is transparent).

Referring generally to FIG. 5, and particularly to, e.g., FIGS. 2A, 3A, and 3B, according to method 500, visual template-alignment indicator 180 extends to first inner peripheral edge 111 of first portion 110. The preceding subject matter of this paragraph characterizes example 59 of the present disclosure, wherein example 59 also includes the subject matter according to example 58, above.

Proximity of visual template-alignment indicator 180 and alignment feature 615 (on workpiece 600), which is used for aligning with visual template-alignment indicator 180, ensures the precision of the angular alignment of template 100 relative to workpiece 600. The user will be more precise and perform this alignment step much faster when an end of visual template-alignment indicator 180 is positioned right next to alignment feature 615.

In some examples, alignment feature 615 of workpiece 600 is positioned on protuberance 610 and near first inner peripheral edge 111. In these examples, visual template-alignment indicator 180 extends to first inner peripheral edge 111 to ensure precise angular alignment. Visual template-alignment indicator 180, which extends to first inner peripheral edge 111, is, for example, printed, engraved, marked, or otherwise positioned on at least first-portion environment-facing surface 116.

Referring generally to FIG. 5, and particularly to, e.g., FIGS. 2A and 6C, according to method 500, visual template-alignment indicator 180 extends to second outer peripheral edge 133 of second portion 130. The preceding subject matter of this paragraph characterizes example 60 of the present disclosure, wherein example 60 also includes the subject matter according to example 58 or 59, above.

Proximity of visual template-alignment indicator 180 and alignment feature 615 (on workpiece 600), which is used for aligning with visual template-alignment indicator 180, ensures the precision of the angular alignment of template 100 relative to workpiece 600. The user will be more precise and perform this alignment step much faster when an end of visual template-alignment indicator 180 is positioned right next to alignment feature 615.

In some examples, alignment feature 615 of template 100 is positioned outside of the footprint of template 100 and near second outer peripheral edge 133 as shown, for example, in FIG. 6C. In these examples, visual template-alignment indicator 180 extends to second outer peripheral edge 133 to ensure the angular alignment precision. Visual template-alignment indicator 180, which extends to second outer peripheral edge 133, is, for example, printed, engraved, marked, or otherwise positioned on at least second-portion environment-facing surface 136. Visual template-alignment indicator 180, which extends to second outer peripheral edge 133, also extends to first inner peripheral edge 111 as shown, for example, in FIG. 2A. Alternatively, visual template-alignment indicator 180, which extends to second outer peripheral edge 133, does not extend to first inner peripheral edge 111 as shown, for example, in FIG. 4A.

Referring generally to FIG. 5, and particularly to, e.g., FIGS. 2A and 4E, according to method 500, (block 510) advancing template 100 toward workpiece 600 comprises (block 524) enabling a gaseous substance between template 100 and workpiece 600 to escape through at least one vent opening 118 in first portion 110. The preceding subject matter of this paragraph characterizes example 61 of the present disclosure, wherein example 61 also includes the subject matter according to any one of examples 51 to 60, above.

At least one vent opening 118 (or a plurality thereof), which enables a gaseous substance to flow therethrough, is used to prevent air bubbles from being trapped between template 100 and workpiece 600 when template 100 is placed on workpiece 600. Eliminating air bubbles ensures proper alignment and adhesion of template 100 relative to workpiece 600. Also, eliminating air bubbles ensures direct and continuous contact between template 100 and workpiece 600 and prevents material 620 from flowing between template 100 and workpiece 600.

In some examples, at least one vent opening 118 is positioned on first portion 110 and is especially useful at this location when first inner peripheral edge 111 is sufficiently airtight with protuberance 610 when protuberance 610 is inserted into positioning opening 115. The gaseous substance, e.g., air between template 100 and workpiece 600, is not able to escape between first inner peripheral edge 111 and protuberance 610 when template 100 is advanced toward base 612 of protuberance 610. At the same time, the gaseous substance is not able to reach second outer peripheral edge 133 of second portion 130, especially if second portion 130 is being adhered to workpiece 600 before first portion 110.

In some examples, at least one vent opening 118 is formed using a mechanical cutter (e.g., a die cutter), a laser cutter, or other types of cutting/material-removal tools. When at least one vent opening 118 is one of multiple vent openings, as shown in FIG. 2A, for example, these multiple vent openings are evenly distributed throughout first portion 110.

At least one vent opening 118 is a through opening. For purposes of this disclosure, the term "through opening" is defined as an opening that extends, inclusively, between two opposite sides of an object and enables fluid flow through the opening.

Referring generally to FIG. 5, and particularly to, e.g., FIGS. 4C and 4D, according to method 500, at least one vent opening 118 is at least in part defined by first inner peripheral edge 111 of first portion 110. The preceding subject matter of this paragraph characterizes example 62 of the present disclosure, wherein example 62 also includes the subject matter according to example 61, above.

When at least one vent opening 118 is, at least in part, defined by first inner peripheral edge 111, at least one vent opening 118 extends to and open to positioning opening 115. This feature enables a gaseous substance to flow through at least one vent opening 118 near positioning opening 115, thereby preventing air bubbles between template 100 and workpiece 600. Furthermore, at least one vent opening 118 that is, at least in part, defined by first inner peripheral edge 111, is circumferentially open and assists with separating first portion 110 of template 100 from second portion 130.

At least one vent opening 118 that is circumferentially open is formed using a mechanical cutter (e.g., a die cutter), laser cutter, or other types of cutting/material-removal tools. In some examples, at least one vent opening 118 is formed in the same step with forming positioning opening 115. At least one vent opening 118 that is, at least in part, defined by first inner peripheral edge 111, is also, at least in part, defined by initial part 132 of second inner peripheral edge 131 as shown, for example, in FIGS. 4D and 4E.

Referring generally to FIG. 5, and particularly to, e.g., FIGS. 2A and 2B, according to method 500, (block 530) separating first portion 110 of template 100 from second portion 130 comprises (block 532) pulling first-portion tab 119 of first portion 110. The preceding subject matter of this paragraph characterizes example 63 of the present disclosure, wherein example 63 also includes the subject matter according to any one of examples 51 to 62, above.

When first-portion tab 119 projects over second-portion environment-facing surface 136 of second portion 130, the process of lifting first-portion tab 119 and pulling it away from second-portion environment-facing surface 136 is simpler than, for example, when first-portion tab 119 is positioned at the same level with second portion 130. In this example, the end of first-portion tab 119 is readily accessible and is picked up when the user slides an object over second-portion environment-facing surface 136 toward first-portion tab 119.

At least two examples of template 100, in which first-portion tab 119 projects over second-portion environment-facing surface 136, are available. In the first example, first-portion tab 119 is attached to first portion 110 while first portion 110 and second portion 130 are made from the same sheet. In another example, first portion 110 is attached to second portion 130, while first-portion tab 119 and first portion 110 are made from the same sheet.

Referring generally to FIG. 5, and particularly to, e.g., FIGS. 2A and 2B, according to method 500, (block 550) detaching second portion 130 of template 100 from workpiece 600 comprises (block 552) pulling second-portion tab 139 of second portion 130. The preceding subject matter of this paragraph characterizes example 64 of the present disclosure, wherein example 64 also includes the subject matter according to any one of examples 51 to 63, above.

Second-portion tab 139 is used to enable removal of second portion 130 from workpiece 600 after material has been applied over workpiece 600 and, in some examples, over second inner peripheral edge 131. Second portion 130 is removably attached to workpiece 600 using, for example, adhesive layer 160, located on at least a portion of second-portion workpiece-facing surface 134. However, second-portion tab 139 is adhesive free and the edge of second-portion tab 139 is easily accessible by the user.

Second-portion tab 139 is picked up and pulled away from workpiece 600 by the user, when second portion 130 is removed from workpiece 600. Second-portion tab 139 forms or is attached to second outer peripheral edge 133 of second portion 130 and initiates peeling of second portion 130 from workpiece 600 at second outer peripheral edge 133. Specifically, in some examples, second-portion tab 139 is monolithic with the rest of second portion 130, e.g., formed from the same sheet and having the same thickness and composition. Alternatively, second-portion tab 139 is attached to the rest of second portion 130 using, for example, adhesive, welding, or other techniques.

Referring generally to FIG. 5, and particularly to, e.g., FIGS. 2A and 2B, according to method 500, (block 550) detaching second portion 130 of template 100 from workpiece 600 comprises (block 554) pulling additional second-portion tab 137 of second portion 130, located opposite second-portion tab 139. The preceding subject matter of this paragraph characterizes example 65 of the present disclosure, wherein example 65 also includes the subject matter according to example 64, above.

When second portion 130 is removed from workpiece 600, protuberance 610 interferes with second portion 130 especially when the radial distance between protuberance 610 and second inner peripheral edge 131 is small and/or when second portion 130 is removed (e.g., peeled) at a large angle relative to workpiece 600. Additional second-portion tab 137, together with second-portion tab 139, helps to remove second portion 130 while second portion 130 is substantially parallel or close to be parallel to workpiece 600 or at least reduces the angle at which second portion 130 is positioned relative to workpiece 600 during the removal step.

In some examples, additional second-portion tab 137 and second-portion tab 139 are positioned on opposite ends of template 100 as schematically shown, for example, in FIGS. 2A and 2B. Both additional second-portion tab 137 and second-portion tab 139 are adhesive free. Both additional second-portion tab 137 and second-portion tab 139 are picked up and pull away from workpiece 600 removal of second portion 130 from workpiece 600. Both additional second-portion tab 137 and second-portion tab 139 form or are attached to second outer peripheral edge 133 of second portion 130 and initiate peeling on second portion 130 at second outer peripheral edge 133. In some examples, one or both additional second-portion tab 137 and second-portion tab 139 are adhered to workpiece 600.

Referring generally to FIG. 5, and particularly to, e.g., FIGS. 2A and 2B, according to method 500, second-portion tab 139 and additional second-portion tab 137 are pulled simultaneously to detach second portion 130 of template 100 from workpiece 600. The preceding subject matter of this paragraph characterizes example 66 of the present disclosure, wherein example 66 also includes the subject matter according to example 65, above.

By pulling second-portion tab 139 and additional second-portion tab 137 simultaneously, to detach second portion 130 of template 100 from workpiece 600, second portion 130 is maintained, for example, substantially parallel or close to be parallel to workpiece 600 or at least the angle is reduced at which second portion 130 is positioned relative to workpiece 600 during the removal step. This, in turn, enables avoiding interference between protuberance 610 and second portion 130.

In some examples, second-portion tab 139 and additional second-portion tab 137 are positioned on opposite ends of template as schematically shown, for example, in FIGS. 2A and 2B. Furthermore, second-portion tab 139 and additional second-portion tab 137 are positioned, for example, at the same distance from second inner peripheral edge 131. This feature ensures that the portions of second inner peripheral edge 131, closest to second-portion tab 139 and to additional second-portion tab 137, are separated from workpiece 600 roughly at the same time during the removal operation.

Referring generally to FIG. 5, and particularly to, e.g., FIGS. 2A and 2B, according to method 500, second-portion tab 139 and additional second-portion tab 137 are pulled toward protuberance 610. The preceding subject matter of this paragraph characterizes example 67 of the present disclosure, wherein example 67 also includes the subject matter according to example 66, above.

Pulling second-portion tab 139 and additional second-portion tab 137 toward protuberance 610 creates peeling effect, which reduces the amount of force needed to separate second portion 130 from workpiece 600 in comparison, for example, to second portion 130 away from workpiece 600 in a direction perpendicular to the surface of workpiece 600.

In some examples, each of second-portion tab 139 and additional second-portion tab 137 is pulled independently. For example, second-portion tab 139 is pulled before additional second-portion tab 137 or vice versa. Alternatively, both second-portion tab 139 and additional second-portion tab 137 are pulled at the same time.

Referring generally to FIG. 5, and particularly to, e.g., FIGS. 2A and 2B, according to method 500, second-portion tab 139 is pulled toward protuberance 610. The preceding subject matter of this paragraph characterizes example 68 of the present disclosure, wherein example 68 also includes the subject matter according to example 64, above.

Pulling second-portion tab toward protuberance 610 creates peeling effect, which reduces the amount of force needed to separate second portion 130 from workpiece 600 in comparison, for example, to second portion 130 away from workpiece 600 in a direction perpendicular to the surface of workpiece 600. In some examples, second-portion tab 139 is pulled manually by an operator. Alternatively, second-portion tab 139 is pulled using a specially designed machine.

Referring generally to FIG. 5, and particularly to, e.g., FIGS. 2A, 2E, 3A-3D, and 4A-4C, according to method 500, visual material-placement indicator 170 and second inner peripheral edge 131 of second portion 130 are concentric. The preceding subject matter of this paragraph characterizes example 69 of the present disclosure, wherein example 69 also includes the subject matter according to any one of examples 51 to 68, above.

Visual material-placement indicator 170 and second inner peripheral edge 131 being concentric is one of the factors, indicating that the gap (or the shortest radial distance) between visual material-placement indicator 170 and second inner peripheral edge 131 will be the same around the entire perimeter of second inner peripheral edge 131. As such, the runout distance of material 620 that is allowed past second inner peripheral edge 131 and up to visual material-placement indicator 170 will be similar around the entire perimeter of visual material-placement indicator 170. As a result, the height of outer edge 621 of material 620, after removal of second portion 130 from workpiece 600, will vary minimally around the entire perimeter of outer edge 621.

The gap (or the shortest radial distance) between visual material-placement indicator 170 and second inner peripheral edge 131 depends on characteristics of material 620 (e.g., viscosity), characteristics of second-portion environment-facing surface 136 of second portion 130 (e.g., surface tension), a desired height of outer edge 621 of material 620, and other factors. In some examples, this gap (or the shortest radial distance) is between about 0.5 millimeters and about 5 millimeters or, more specifically, between about 1 millimeter and about 3 millimeters. The gap (or the shortest radial distance) is, for example, constant around the entire perimeter of visual material-placement indicator 170 (e.g., within 25% deviation or even within 10% deviation from the visual material-placement indicator).

Referring generally to FIG. 5, and particularly to, e.g., FIGS. 2A, 2E, 3A-3D, and 4A-4C, according to method 500, visual material-placement indicator 170 and second inner peripheral edge 131 of second portion 130 are geometrically similar. The preceding subject matter of this paragraph characterizes example 70 of the present disclosure, wherein example 70 also includes the subject matter according to example 69, above.

Visual material-placement indicator 170 and second inner peripheral edge 131 being geometrically similar is one of the factors, indicating that the gap (or the shortest radial distance) between visual material-placement indicator 170 and second inner peripheral edge 131 will be the same around the entire perimeter of second inner peripheral edge 131. As such, the runout of material 620 that is allowed past second inner peripheral edge 131 and up to visual material-placement indicator 170 will be similar around the entire perimeter of visual material-placement indicator 170. As a result, the height of outer edge 621 of material 620, after removal of second portion 130 from workpiece 600, will vary minimally around the entire perimeter of outer edge 621.

In some examples, visual material-placement indicator 170 and second inner peripheral edge 131 are both circular as shown, for example, in FIG. 2A. However, other shapes are also within the scope. In some examples, visual material-placement indicator 170 and second inner peripheral edge 131, as well as positioning opening 115, all have the same shape.

Referring generally to FIG. 5, and particularly to, e.g., FIGS. 2E-2G, according to method 500, (block 540) applying material 620 to workpiece 600 comprises (block 541) controlling flow of material 620 on second-portion environment-facing surface 136 using visual material-placement indicator 170. The preceding subject matter of this paragraph characterizes example 71 of the present disclosure, wherein example 71 also includes the subject matter according to any one of examples 51 to 70, above.

While visual material-placement indicator 170 is operable as a visual guide for the user, placing material 620 onto workpiece 600, additional functionality is provided by the ability of visual material-placement indicator 170 to control flow of material 620 on second-portion environment-facing surface 136. In particular, in some examples, visual material-placement indicator 170 prevents flow of material 620 across visual material-placement indicator 170. For example, material 620, which has a low viscosity and/or is deposited as a thick layer, tends to flow on second-portion environment-facing surface 136 after its deposition. When visual material-placement indicator 170 is able to control the flow of material 620 on second-portion environment-facing surface 136, the user does not need to worry about this post-deposition flow.

In some examples, visual material-placement indicator 170 controls the flow of material 620 on second-portion environment-facing surface 136 when visual material-placement indicator 170 protrudes above second-portion environment-facing surface 136, recesses below second-portion environment-facing surface 136, or otherwise modifies one or more surface properties of second-portion environment-facing surface 136. For example, the surface tension of second-portion environment-facing surface 136 is changed at a specific location by adding visual material-placement indicator 170 to this location. Visual material-placement indicator 170 is formed, for example, by adding material, removing material, or changing a part of second-portion environment-facing surface 136.

Referring generally to FIG. 5, and particularly to, e.g., FIG. 2G, according to method 500, (block 541) controlling flow of material 620 on second-portion environment-facing surface 136 comprises providing an obstacle to flow of material 620 with visual material-placement indicator 170, at least portion of which is inwardly recessed relative to second-portion environment-facing surface 136. The preceding subject matter of this paragraph characterizes example 72 of the present disclosure, wherein example 72 also includes the subject matter according to example 71, above.

Visual material-placement indicator 170 that is recessed relative to second-portion environment-facing surface 136 is used to control the flow of material 620 on second-portion environment-facing surface 136. Specifically, visual material-placement indicator 170 that is recessed acts as a barrier to stop material 620 from flowing beyond visual material-placement indicator 170. Visual material-placement indicator 170 changes the profile of second-portion environment-facing surface 136 and flow properties of material 620 on second-portion environment-facing surface 136. Material 620 is allowed to flow up to visual material-placement indicator 170, but not past visual material-placement indicator 170.

In some examples, visual material-placement indicator 170 that is recessed is formed by removing material from second-portion environment-facing surface 136. For example, laser ablation is used to form visual material-placement indicator 170 of this type. Alternatively, some material is redistributed on second-portion environment-facing surface 136 to form visual material-placement indicator 170 that projects outwardly. The depth of visual material-placement indicator 170, when recessed, depends, for example, on characteristics of material 620 (e.g., viscosity), characteristics of second-portion environment-facing surface 136 of second portion 130 (e.g., surface tension), and other factors. In some examples, the depth is between about 0.2 millimeters and about 1 millimeter or, more specifically, between about 0.3 millimeters and about 0.8 millimeters.

Referring generally to FIG. 5, and particularly to, e.g., FIG. 2F, according to method 500, (block 541) controlling flow of material 620 on second-portion environment-facing surface 136 comprises providing an obstacle to flow of material 620 with visual material-placement indicator 170, at least portion of which projects outwardly relative to second-portion environment-facing surface 136. The preceding subject matter of this paragraph characterizes example 73 of the present disclosure, wherein example 73 also includes the subject matter according to example 71 or 72, above.

Visual material-placement indicator 170 projecting outwardly relative to second-portion environment-facing surface 136 is used to control the flow of material 620 on second-portion environment-facing surface 136, in addition to the controlled application of material 620 by the user. Specifically, visual material-placement indicator 170 projecting outwardly acts as a barrier for material 620 to stop material 620 from flowing beyond visual material-placement indicator 170. Material 620 is allowed to flow up to visual material-placement indicator 170, but not past visual material-placement indicator 170.

In some examples, visual material-placement indicator 170 projecting outwardly is formed by adding material to second-portion environment-facing surface 136. For example, additive manufacturing techniques are used to form visual material-placement indicator 170. Alternatively, some material is redistributed on second-portion environment-facing surface 136 to form visual material-placement indicator 170 that projects outwardly. The height of visual material-placement indicator 170 projecting outwardly (e.g., between the tip of visual material-placement indicator 170 and second-portion environment-facing surface 136) depends on characteristics of material 620 (e.g., viscosity), characteristics of second-portion environment-facing surface 136 of second portion 130 (e.g., surface tension), a desired height of outer edge 621 of material 620, and other factors. In some examples, the height of the visual material-placement indicator is between about 0.2 millimeters and about 1 millimeter or, more specifically, between about 0.3 millimeters and about 0.8 millimeters.

Examples of the present disclosure are described in the context of aircraft manufacturing and service method 800 as shown in FIG. 8 and aircraft 700 as shown in FIG. 7. During pre-production, illustrative method 800 includes specification and design (block 804) of aircraft 700 and material procurement (block 806). During production, component and subassembly manufacturing (block 808) and system integration (block 810) of aircraft 700 takes place. Thereafter, aircraft 700 goes through certification and delivery (block 812) to be placed in service (block 814). While in service, aircraft 702 is be scheduled for routine maintenance and service (block 816). Routine maintenance and service include modification, reconfiguration, refurbishment, etc. of one or more systems of aircraft 700.

Each of the processes of illustrative method 800 is be performed or carried out by a system integrator, a third party, and/or an operator (e.g., a customer). For the purposes of this description, a system integrator includes, without limitation, any number of aircraft manufacturers and major-system subcontractors; a third party includes, without limitation, any number of vendors, subcontractors, and suppliers; and an operator is, for examples, an airline, leasing company, military entity, service organization, and so on.

As shown in FIG. 7, aircraft 700 produced by illustrative method 800 may include airframe 750 with a plurality of high-level systems and interior 770. Examples of high-level systems include one or more of propulsion system 730, electrical system 760, hydraulic system 740, and environmental system 770. Any number of other systems may be included. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 800. For example, components or subassemblies corresponding to component and subassembly manufacturing (block 808) may be fabricated or manufactured in a manner similar to components or subassemblies produced while aircraft 700 is in service (block 814). Also, one or more examples of the apparatus(es), method(s), or combination thereof may be utilized during production stages 808 and 810, for example, by substantially expediting assembly of or reducing the cost of aircraft 700. Similarly, one or more examples of the apparatus or method realizations, or a combination thereof, may be utilized, for example and without limitation, while aircraft 700 is in service (block 814) and/or during maintenance and service (block 816).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of applying material to a workpiece around a protuberance, extending from the workpiece, the method comprising steps of:
    advancing a template toward the workpiece to insert the protuberance into a positioning opening, located in a first portion of the template, and wherein:
        a first-portion workpiece-facing surface of the first portion partially overlaps with and is removably attached to a second-portion environment-facing surface of the second portion, forming an interface between the first-portion workpiece-facing surface and the second-portion environment-facing surface;
        the template is advanced toward the workpiece until the template is at least partially located relative to the workpiece via a first inner peripheral edge of the first portion and an adhesive layer, located on at least a portion of a second-portion workpiece-facing surface of the second portion, is in contact with the workpiece;
        the first inner peripheral edge of the first portion is geometrically complementary to a base of the protuberance and defines the positioning opening; and
        the second-portion workpiece-facing surface is opposite the second-portion environment-facing surface;
    removably attaching at least the portion of the second-portion workpiece-facing surface to the workpiece;
    separating the first portion of the template from the second portion along the interface while at least the portion of the second-portion workpiece-facing surface remains attached to the workpiece;
    applying the material to the workpiece around the protuberance such that the material overlaps a second inner peripheral edge of the second portion of the template, but does not overlap a visual material-placement indicator, located on the second-portion environment-facing surface, and wherein the visual material-placement indicator surrounds and is spaced away from the second inner peripheral edge; and
    detaching the second portion of the template from the workpiece.

2. The method according to claim 1, wherein the step of removably attaching at least the portion of the second-portion workpiece-facing surface of the second portion of the template to the workpiece comprises pressing the adhesive layer, located on at least the portion of the second-portion workpiece-facing surface, against the workpiece.

3. The method according to claim 1, wherein:
    the step of separating the first portion of the template from the second portion comprises separating the interface by pealing apart a weld, joining the first portion and the second portion and located between a first outer peripheral edge of the first portion and the second inner peripheral edge of the second portion; and
    the first outer peripheral edge is opposite the first inner peripheral edge of the first portion.

4. The method according to claim 1, wherein:
    the step of separating the first portion of the template from the second portion comprises separating the interface by pealing apart an interface adhesive layer, joining the first portion and the second portion and located between a first outer peripheral edge of the first portion and the second inner peripheral edge of the second portion; and
    the first outer peripheral edge is opposite the first inner peripheral edge of the first portion.

5. The method according to claim 1, further comprising, prior to removably attaching at least the portion of the second-portion workpiece-facing surface of the second portion of the template to the workpiece, aligning the template relative to the workpiece using a visual template-alignment indicator located on at least one of a first-portion environment-facing surface of the first portion of the template or the second-portion environment-facing surface of the second portion of the template.

6. The method according to claim 1, wherein the step of advancing the template toward the workpiece comprises enabling a gaseous substance between the template and the workpiece to escape through at least one vent opening in the first portion.

7. The method according to claim 1, wherein the step of separating the first portion of the template from the second portion comprises pulling a first-portion tab of the first portion.

8. The method according to claim 1, wherein the step of detaching the second portion of the template from the workpiece comprises pulling a second-portion tab of the second portion.

9. The method according to claim 8, wherein the step of detaching the second portion of the template from the workpiece further comprises pulling an additional second-portion tab of the second portion, located opposite the second-portion tab.

10. The method according to claim 1, wherein the step of applying the material workpiece comprises a step of controlling flow of the material on the second-portion environment-facing surface using the visual material-placement indicator.

11. The method according to claim 1, further comprising curing the material prior to detaching the second portion of the template from the workpiece.

12. The method according to claim 1, further comprising detaching the second portion of the template from the workpiece before curing the material.

13. The method according to claim 1, wherein the first inner peripheral edge of the first portion is circumferentially closed.

14. The method according to claim 5, wherein the visual template-alignment indicator extends to the first inner peripheral edge of the first portion.

15. The method according to claim 5, wherein the visual template-alignment indicator extends to a second outer peripheral edge of the second portion.

16. The method according to claim 6, wherein the at least one vent opening is at least in part defined by the first inner peripheral edge of the first portion.

17. The method according to claim 9, wherein the second-portion tab and the additional second-portion tab are pulled simultaneously to detach the second portion of the template from the workpiece.

18. The method according to claim 17, wherein the second-portion tab and the additional second-portion tab are pulled toward the protuberance.

19. The method according to claim 8, wherein the second-portion tab is pulled toward the protuberance.

20. The method according to claim 1, wherein the visual material-placement indicator and the second inner peripheral edge of the second portion are concentric.

\* \* \* \* \*